(12) United States Patent
Brandt

(10) Patent No.: US 11,255,765 B2
(45) Date of Patent: Feb. 22, 2022

(54) HELMET TESTING EQUIPMENT AND METHODOLOGY

(71) Applicant: Richard A. Brandt, New York, NY (US)

(72) Inventor: Richard A. Brandt, New York, NY (US)

( * ) Notice: Subject to any disclaimer, the term of this patent is extended or adjusted under 35 U.S.C. 154(b) by 0 days.

(21) Appl. No.: 17/077,687

(22) Filed: Oct. 22, 2020

(65) Prior Publication Data

US 2021/0109000 A1 Apr. 15, 2021

Related U.S. Application Data

(62) Division of application No. 16/134,495, filed on Sep. 18, 2018, now Pat. No. 10,837,887.

(60) Provisional application No. 62/560,289, filed on Sep. 19, 2017.

(51) Int. Cl.
*G01N 3/30* (2006.01)
*G01N 3/307* (2006.01)
*G01N 3/303* (2006.01)

(52) U.S. Cl.
CPC ............. *G01N 3/30* (2013.01); *G01N 3/303* (2013.01); *G01N 3/307* (2013.01); *G01N 2203/001* (2013.01); *G01N 2203/0019* (2013.01); *G01N 2203/0035* (2013.01); *G01N 2203/0037* (2013.01); *G01N 2203/0676* (2013.01)

(58) Field of Classification Search
CPC ........ G09B 23/30; G09B 23/32; G01L 5/0052
See application file for complete search history.

(56) References Cited

U.S. PATENT DOCUMENTS

| | | | |
|---|---|---|---|
| 5,922,937 A | 7/1999 | Kowalski | G01M 17/0078 73/12.13 |
| 6,871,525 B2 * | 3/2005 | Withnall | G01N 3/32 73/12.14 |
| 7,743,640 B2 | 6/2010 | Lampe | A42B 3/068 73/12.04 |
| 9,581,533 B2 * | 2/2017 | Wu | G01N 3/42 |
| 10,197,484 B2 | 2/2019 | Brandt | |
| 10,444,099 B2 | 10/2019 | Sicking | G01L 5/0052 |
| 2015/0369694 A1 * | 12/2015 | Neale | G01L 5/00 73/12.01 |

* cited by examiner

*Primary Examiner* — Justin N Olamit
(74) *Attorney, Agent, or Firm* — R. Neil Sudol; Henry D. Coleman

(57) ABSTRACT

A method for testing a helmet for effectiveness of user protection includes moving a load along a predetermined path, supporting a target body at an impact location in the predetermined path, the target body including a head model and a helmet disposed on the head model, and impacting the target body with a force generated by the moving of the load. The impacting of the target body entails contacting the target body with an impactor free to move perpendicularly and tangentially relative to a surface of the target body. The supporting of the target body is at least reduced, if not eliminated, before or during the impact of the impactor with the target body at the location. Forces generated are automatically measured or sensed during the impact of the impactor with the target body at the location.

5 Claims, 19 Drawing Sheets

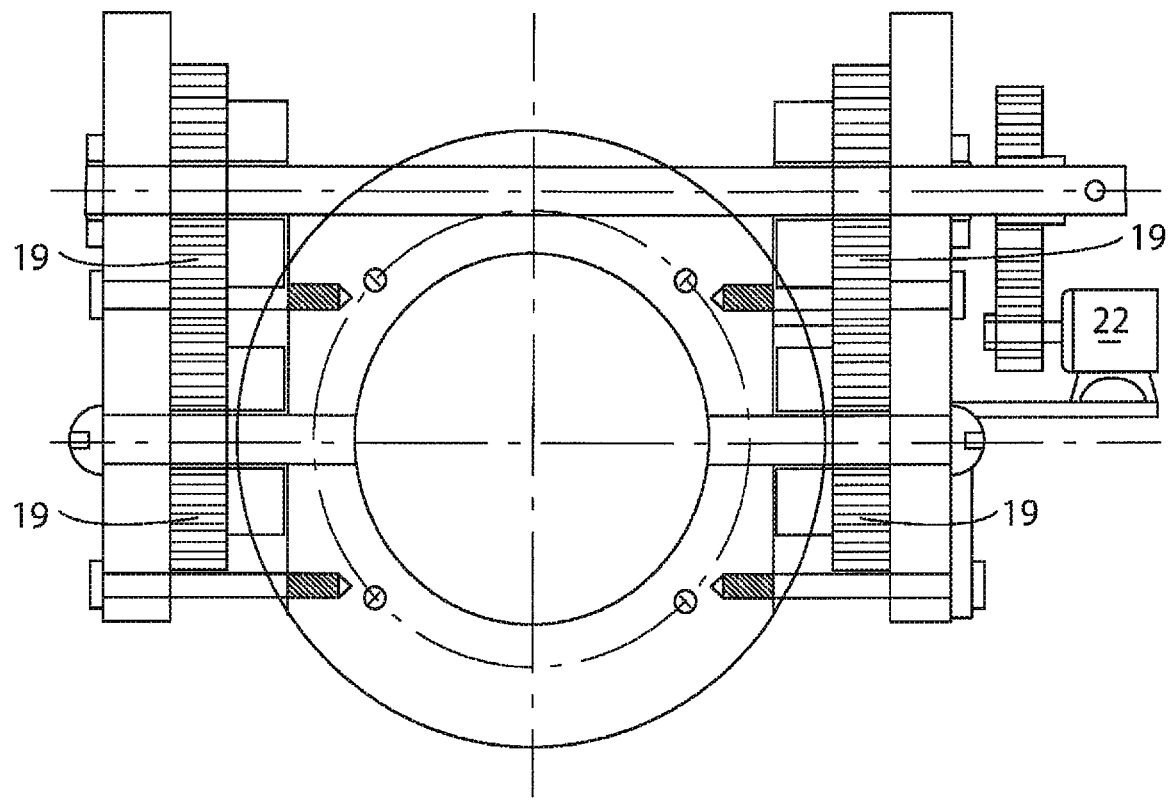
FIG. 7A
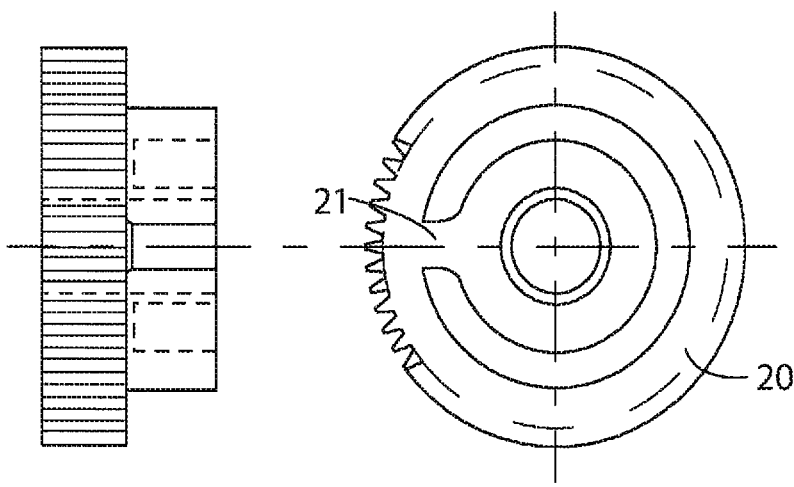
FIG. 7C  FIG. 7B

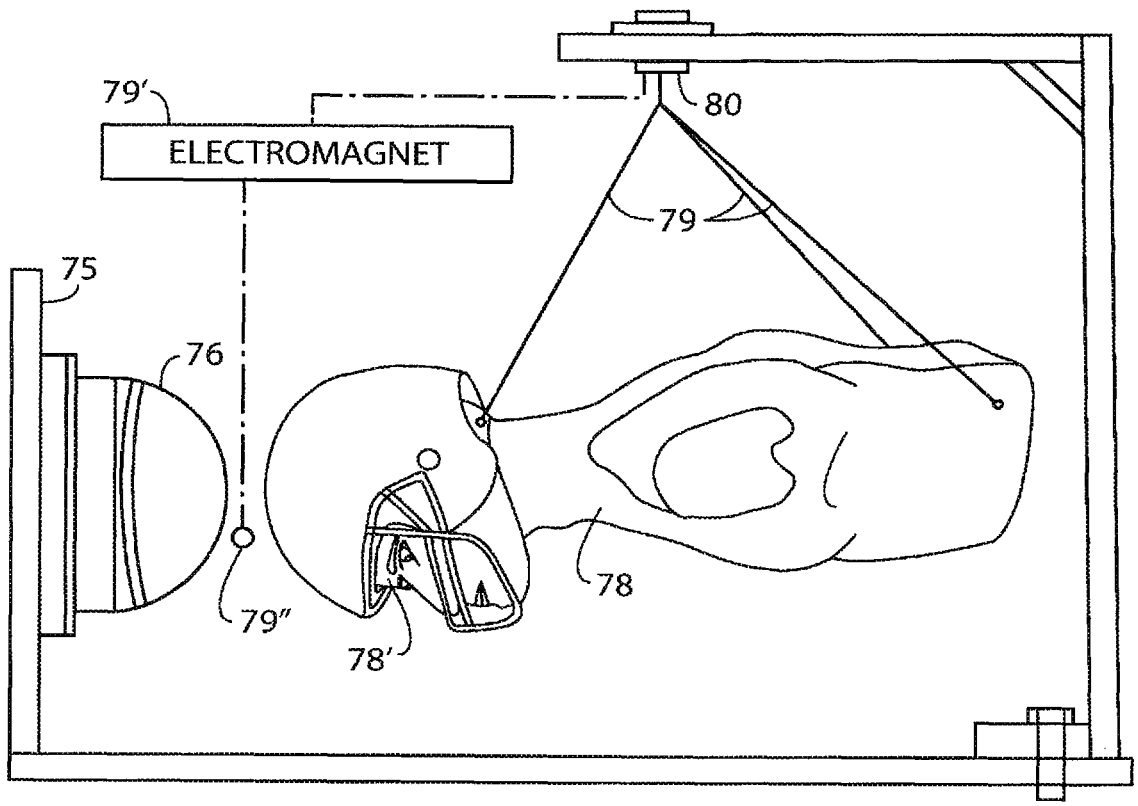
FIG. 20
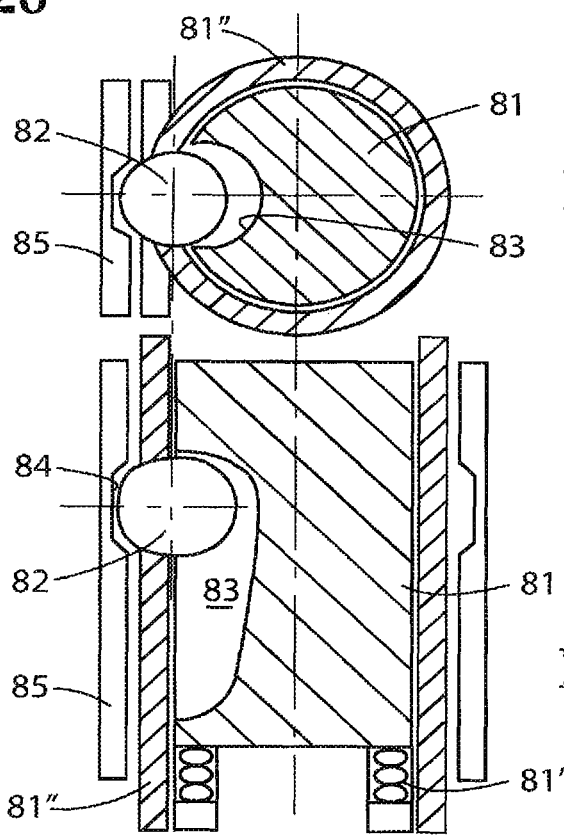
FIG. 21B
FIG. 21A

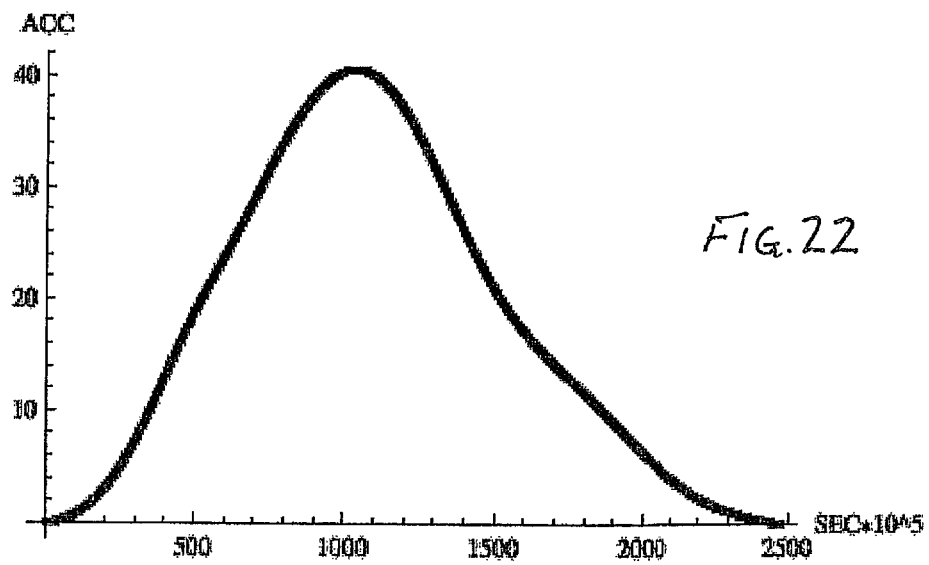
Plot of impact acceleration (in g units) vs time (in sec*10^5 units).
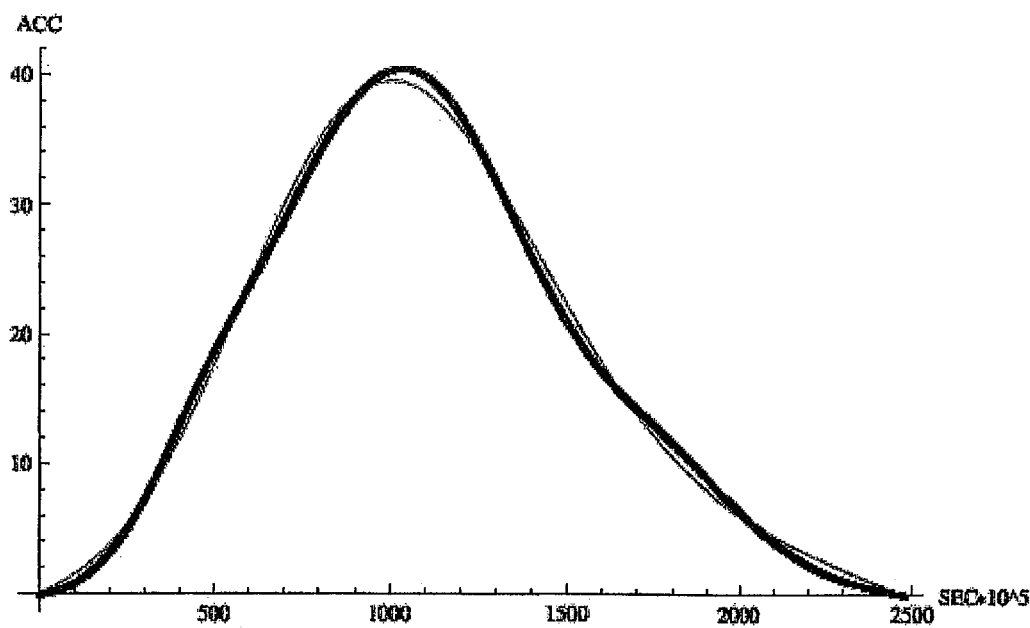
Plot of harmonic fit (red) to the acceleration profile (blue) of Fig.22
FIG. 23

Plot of the five harmonics used in the fit to the acceleration profile of Fig.

Plot of applied force on helmet vs time.

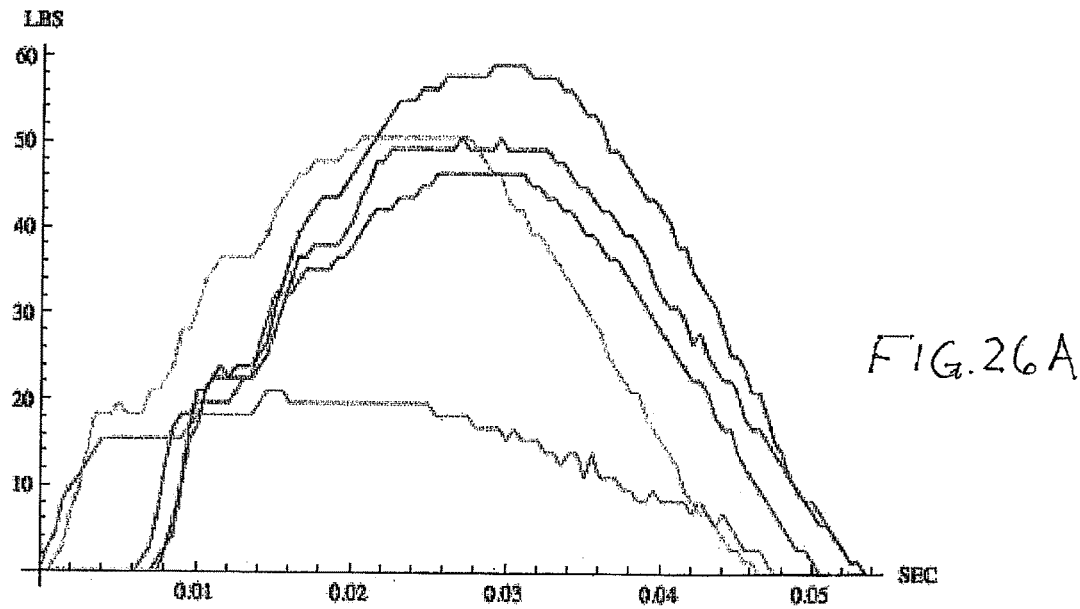
Plots of forces transmitted through helmet onto five sensors.
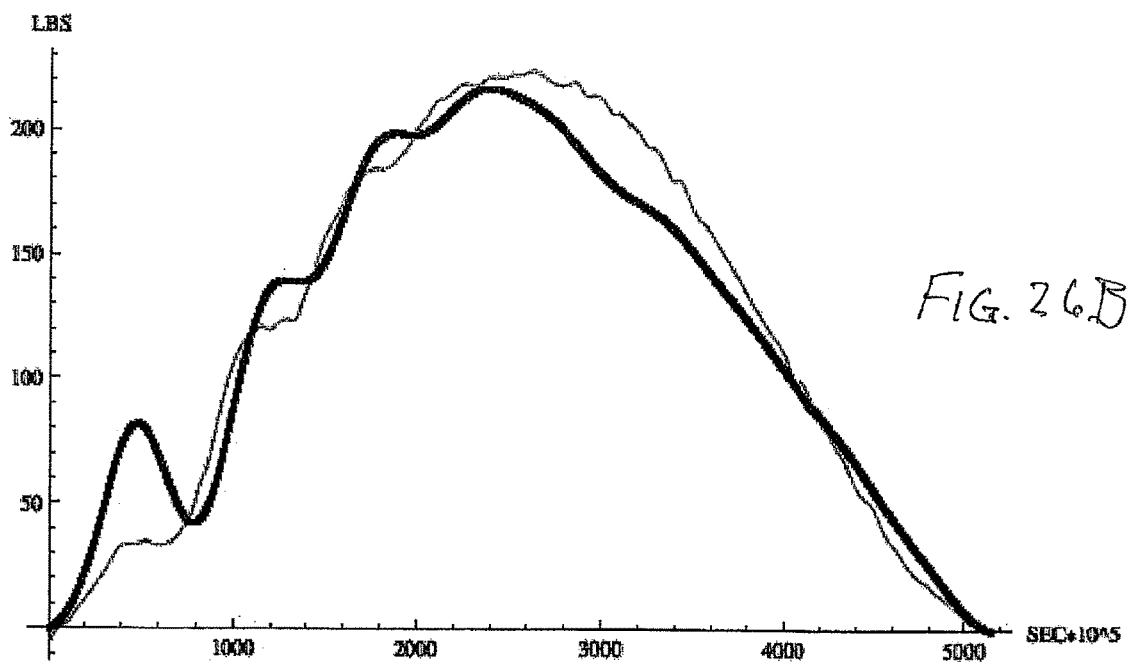
Plot of the sum of the five force profiles of Fig. 26A arising from the applied force profile of Fig. 25.

Applied force profile from helmet drop.

Applied force profile from free impact.

HELMET TESTING EQUIPMENT AND METHODOLOGY

BACKGROUND OF THE INVENTION

This invention relates to a method for testing personal safety accessories such as helmets. This invention also relates to associated apparatus for carrying out testing protocols.

It has been widely reported during the past 20 years that the collisions experienced by participants in contact sports and other potentially injurious endeavors are often strong enough to give rise to mild traumatic brain injuries (MTBI) such as concussions. It is a common occurrence in American football for impact speeds to exceed 20 mph (9 m/s), creating linear head accelerations exceeding 100 g's and concussion risks exceeding 70%. This has created a health hazard of epidemic proportions, with several million incidents of MTBI occurring yearly at all levels of play in all sports. (American football has the highest incidence, and it is estimated that nearly one-third of all retired NFL players will develop some level of long-term neurological disease.) In response to the MTBI epidemic, more protective helmets have been introduced and used by participants in sports and other endeavors such as car and bicycle racing, but the frequency of MTBI has remained alarmingly high. It was recently reported that a study of the brains of 111 (deceased) former NFL players revealed that 110 of them had Chronic Traumatic Encephalopathy, the degenerative MTBI caused by repeated blows to the head.

The first line of defense against MTBI for contact game participants is their protective helmet. It is therefore of the utmost importance that these helmets provide as much protection for the user as possible. This has been recognized since the early days of American football, but it was not until 1973 that a serious effort to measure the protective capability of helmets was made by the National Operating Committee on Standards for Athletic Equipment (NOCSAE). NOCSAE introduced a helmet testing method and related standard (described below) that provided a means to compare the protective performances of various helmets. This protocol, which has been updated numerous times, was a first attempt to insure that the helmets used in football games were compliant with a stated performance standard. This standard has been adopted by many sports associations and, along with sensible rule changes regarding tackling, has played an important role in the attempts to reduce MTBI. Subsequent to the introduction of the NOCSAE standard, there have been a number of other proposed helmet testing devices and protocols. It will be demonstrated below that all of these protocols are inadequate because the impacts they analyze, generated using testing laboratory (lab) equipment, differ in significant ways from the impacts experienced by game participants. Also, the existing standards only relate to head accelerations resulting from impacts, but ignore the equally important distribution of impact-created forces transmitted through helmets onto a user's head. It is believed that these limitations contribute to the continued frequent occurrence of MTBI in contact sports. (Another contributor is the inadequate protective capabilities of available helmets.)

PRIOR ART a. Current NOCSAE Standard Drop Test Method

In this method, illustrated in FIG. 1, a helmet to be tested is affixed to a Hybred III (H3, described in humaneticsatd.com/crash-test-dummies) head-form 1101 attached to a rigid aluminum frame 1102. The frame 1102 is constrained to slide, from a specified height, down a pair of vertical wires 1103, so that the head-helmet 1101 falls onto a fixed metal anvil 1104 covered with a firm rubber pad (not separately depicted). The head-helmet 1101 is oriented on the frame 1102 such that the impact with the anvil 1104 occurs at a prescribed location on the helmet. There are three possible headform weights (9.1 lb, 10.8 lb, 13.1 lb). Accelerometers attached to the head-form record the acceleration of the head-helmet 1101 during the impact with the anvil target 1104. The NOCSAE standard states that the severity index (SI) evaluated from the recorded acceleration profile is less than a specified upper bound when the head-helmet impacts at a specified speed. (The SI is required to be at most 300 s for a 11.34 fps impact speed (drop height of approximately 2'), and at most 1200 s for a 17.94 fps speed (drop height of approximately 5')). (An updated complete description of the NOCSAE test method and standard is contained in NOCSAE DOC ND 001-13m14c.)

b. Proposed NOCSAE Standard Linear Impact (LI) Test Method

In this method, the helmet to be tested is affixed to a H3 head-form attached to a H3 neck and torso mounted on a translating joint attached to an adjustable table. The impactor is a hemispherical solid covered with foam padding and a urethane helmet shell. It is attached to a horizontal cylindrical piston, guided within a straight cylindrical tube by linear bearings, and propelled by a compressed air cannon. (The impactor with attached piston travels 10 cm after striking the helmet and is then stopped by a breaking cylinder and allowed to rebound backwards within the guide. The H3 dummy is instrumented with accelerometers, load cells, and potentiometers to record responses. As for the drop test standard, the linear impactor standard states that the SI evaluated from the recorded acceleration profile is less than a specified upper bound when the impactor strikes the target helmet at a specified speed. (A complete description of the NOCSAE LI test method is contained in NOCSAE DOC ND 081-04m04.)

c. Pendulum Impact Test Method

In this method, a helmeted H3 head with neck is impacted by a domed spherical surface attached to a weighted pendulum that rotates downward about a fixed horizontal axis. The head is instrumented to measure translational and rotational acceleration, and the head orientation is adjustable to enable impacts at various locations on the helmet. (Methods a-c, and related methods, are described in detail and evaluated in Pellman et al, Neurosurgery 58:78-96, 2006.)

d. Deficiencies in Prior Art Methods

The above test methods, and all others known to us that have been implemented or proposed, create impacts that are very different from those (essentially unconstrained free body) impacts that arise in the field. The most important of these differences are described below.

In the current NOCSAE method (a), the impacting head-helmet is constrained to descend down and rebound back up in a purely vertical direction. Field impact rebounds on the contrary almost always occur at angles that differ significantly from the incident angle. (See FIG. 2) Also, in the current NOCSAE method, the target is fixed and therefore effectively infinitely heavy and completely constrained. There are other deficiencies with this method. One issue is the limited impact speeds that are available. (A 20 mph impact would require a drop height of over 13.5'.) Another issue is the limited number of head weights that are used. The SI evaluated from impacting a 13.1 lb head could have a compliant value whereas the SI that arises from impacting a lighter head at the same speed could be non-compliant. In that case, a compliant helmet could place the player with the lighter head at risk. Another issue is the fact that the method can only measure translational but not rotational acceleration. Also, measuring only the applied accelerations (and corresponding forces) ignores the (previously unrecognized) fact that the transmitted forces applied to the head can be larger than those applied to the helmet at times during the impact, and ignores the degree to which these forces can be spread out by a helmet.

A more recent use of NOCSAE-style drop impacts is the STAR helmet rating system. The STAR rating of a helmet is the theoretical number of concussions a player using the helmet would sustain in one season. It is based on an assumed injury risk function for each measured peak acceleration and an assumed head impact exposure matrix, estimated by using published measurement data and on a number of simplifying assumptions. STAR is an innovative first attempt to quantify helmet performance in terms of a single number, it has all of the same defects as the ones stated above, and others related to the various assumptions and approximations involved.

OBJECTS OF THE INVENTION

It is an object of the present invention to provide improved helmet testing devices and/or apparatus that generate impacts that replicate field impacts more realistically than conventional testing devices.

It is a further object of the present invention to provide improved methods for testing the safety of protective gear such as helmets.

Another object of the present invention is to provide such testing devices, apparatus and/or methods that facilitates the collection of test data pertaining to important characteristics of test impacts.

The present invention contemplates the provision of data analysis protocols that facilitate an accurately evaluation and comparison of the protective capabilities of helmets and that effectively summarize characteristics of helmet safety.

These and other objects of the present invention will be apparent from the drawings and descriptions herein. It is to be noted that any single embodiment of the invention may not achieve all of the objects of the invention, but that every object is attained by at least one embodiment.

SUMMARY OF THE INVENTION

The present invention provides devices and protocols that accurately evaluate and compare the protective capabilities of helmets, and that the present impact measurement devices may be used to closely replicate field impacts. The present devices and protocols are effectively utilized in an attempt to reduce the frequency of minor traumatic brain injury (MTBI).

The proposed NOCSAE LI method (b) described above is an improvement in that both the impactor and the target have finite weight, and large impact speeds are readily obtainable. However, the impactor is even more highly constrained. Before, during, and after the impact, the impacting element and attached piston are constrained to move in a purely horizontal direction, whereas field impact rebounds almost always occur at angles that differ significantly from the incident angle (FIG. 2). Furthermore, the impactor does not interact with the target in a natural way as a free body, but instead it is artificially forced to stop its forward motion after it travels 10 cm after striking the helmet. Also, the H3-helmet target is artificially constrained by it's attachment to a translating joint. This constraint, the horizontal direction impacting constraint, and the external impact termination render the impacts to be very different from field impacts. Also, as with the NOCSAE drop method, only a limited number of head weights are used, and transmitted forces and their distributions are not measured. (Consequences of these defects could help explain why the LI method, introduced in 2006, has yet to be incorporated into a NOCSAE standard.)

The pendulum method (c) described above, and all other reported methods, has similar issues: constrained impacts and rebounds, limited impact speeds, and limited number of head weights. Furthermore, none of these methods involve measurements of transmitted force distributions.

A method for testing a helmet for effectiveness of user protection comprises, in accordance with the present invention, (1) moving a load along a predetermined path, (2) supporting a target body at an impact location in the predetermined path, the target body including a head model and a helmet disposed on the head model, (3) impacting the target body with a force generated by the moving of the load, the impacting of the target body including contacting the target body with an impactor free to move tangentially relative to a surface of the target body, (4) at least partially reducing the supporting of the target body before or during the impact of the impactor with the target body at the location, and (5) automatically measuring forces generated during the impact of the impactor with the target body at the location.

The load may include or consist of the impactor. In that case, the moving of the load includes restraining the impactor during an initial portion of the predetermined path and further includes at least partially eliminating the restraining of the impactor at or prior to impact of the impactor with the target body at the impact location.

The moving of the impactor may comprise operating a cannon device to propel the impactor toward the impact location.

Where the impactor is a contact element resting on the helmet of the target body, the moving of the load may comprise sliding the load, or weight, down a fixed vertical rod onto a spring inserted into the contact element.

In one set of embodiments of the present invention, the impactor is connected to a rotatably supported rod. In that case, the moving of the load comprises rotating the rotatably supported rod at an accelerating angular speed. The method further comprises inserting the target body into the predetermined path at the impact location after and only after a desired impactor speed is attained.

The supporting of the target body at the impact location may include suspending the target body by elongate tensile members attached to an element configured to release the elongate tensile members. The method than further comprises operating the element to release the target body prior to the impact of the impactor with the target body or in response to engagement of the impactor with the target body.

In an alternative embodiment of the present invention, the supporting of the target body at the impact location includes supporting the head model on a rod attached to a holder or bracket via a plurality of springs each extending at least partially transversely or perpendicularly to the rod.

The automatic measuring of forces preferably includes operating a plurality of force sensors spaced from one another on the head model. The force sensors are preferably disposed between an inner surface of the helmet and an outer surface of the head model.

The method may additionally comprise operating a computer or processor to determine impact acceleration data including maximum recorded acceleration, average recorded acceleration, total impact time, severity index, and coefficient of restitution.

A target body for safety testing comprises, in accordance with the present invention, a head model, a helmet mounted to the head model, a plurality of force sensor units distributed over the head model, and a mounting plate or base platform attached to the head model, the force sensors being adjustably attached to the mounting plate or base platform.

Each of the force sensor units may comprise a tube, a post, a compression spring, and a load cell. The post is slidably inserted within the tube and rests on the compression spring, while the compression spring is in turn in operative (possibly indirect) contact with the load cell. The post has an upper section extending out of the tube and terminating in an enlarged head with a convex curved surface disposed in contact with the inner surface of the helmet. The tube may be a main tube having a threaded bottom section that screws into a threaded concentric lower tube that is attached to the mounting plate or base platform. In that event, the height of the main tube is adjustable by rotating the main tube within the threaded concentric lower tube. The location of the main tube on the mounting plate or base platform may be adjustable by sliding the threaded concentric lower tube in a slit or slot in the mounting plate or base platform.

BRIEF DESCRIPTION OF THE DRAWINGS

FIG. 7A is a schematic front elevational view of a holding and release assembly alternatively utilizable in the cannon device of FIG. 4 to lock, compress, and release a compression spring thereof.

FIG. 7B is a schematic front elevational view of a cylinder included in the assembly of FIG. 7A.

FIG. 7C is a side elevational view of a gear included in the assembly of FIG. 7A.

FIG. 20 is a schematic side elevational view of a target body suspension device in accordance with the present invention.

FIG. 21A is a schematic longitudinal cross-sectional view of a force-responsive releasable coupling utilizable in the target body suspension device of FIG. 20.

FIG. 21B is a schematic transverse cross-sectional view taken along line XXI-XXI in FIG. 21A.

FIG. 22 is a plot or graph of impact acceleration, in gravity units, as a function of time, in units of seconds*$10^5$, obtained via testing apparatus pursuant to the present invention.

FIG. 23 is a graph of harmonic fit (light curve) to the acceleration profile of FIG. 22 (dark curve).

FIG. 26A is a set of five graphs of force transmitted through a test helmet to a head model in response to the applied fore of FIG. 25, as measured by five sensor units as shown in FIGS. 10 and 11.

FIG. 26B shows a graph (light curve) of a sum of the five force graphs of FIG. 26A, together with the applied force graph of FIG. 25.

DETAILED DESCRIPTION

The collisions between participants in contact sports are substantially unconstrained free body impacts. Although the colliding players are often in contact with the ground at least part of the time during the collision, these players act as essentially free bodies because the contact forces experienced during collisions are much greater than the other forces (gravity and ground reaction forces) acting on them. (The acceleration of gravity is 1 g and the ground reaction acceleration (force/weight) is less than 3 g, whereas impact accelerations often exceed 100 g.) Furthermore, for the collisions involving the heads of the participants, the interaction with the ground is irrelevant because the impact lasts only about 2 ms and is therefore over by the time the response to the impact travels from the player's head to the ground and back. (An exception is when the collisions occur between a head and the ground.)

Although the colliding players are essentially free bodies, their heads themselves are of course not completely free because they are attached to necks, and the necks are attached to torsos. The strength and physical state of these attachments during an impact determine the extent to which they are relevant to the effect of the impact on the brain. These attachments can be modeled in a lab device by affixing elastic elements to a head model and choosing an appropriate weight of the resultant head-neck-torso model. The strength and placement of the elastic elements, and the weight of the model, should span the range of possible values as determined by biomechanical studies. Since it is essential that none of the game participants are subject to an unnecessary risk, the present invention prescribes that the lab model head (or head model) should have a minimal weight since this choice will give rise to the maximum head acceleration arising from a given impact location and speed. If the impact metrics measured using this lowest weight value are below the level believed to create MTBI, then these metrics will be below this level for all of the game participants.

The present invention recognizes the importance of reducing constraints on impacted and impacting objects in order to more closely simulate actual field conditions. It was stated above how the prior-art testing methods create impacts that differ significantly from field impacts. It is to be demonstrated how the artificial constraints placed on impacts by prior art methods can drastically change the nature of the impacts. In an unconstrained impact of one object onto another at an oblique angle, the velocity of the impacting object will decrease in the tangential direction because of the sliding friction between the objects, and the velocity will decrease in the perpendicular direction because of the elastic damping between the objects. The rebound angle will therefore be very different from the incident angle, and the rebounding object will acquire rotational, as well as linear, motion.

Figure 2:
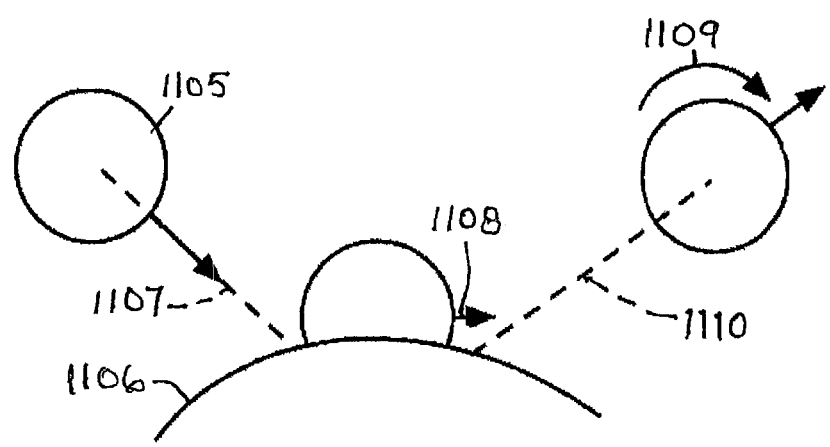
FIG. 2 is a diagram of motion of one substantially free object such as a helmeted head impacting against another substantially free object such as a shoulder pad.

A diagram of this process is illustrated in FIG. 2. An incoming curved object 1105 such as a helmet strikes a second object 1106 such as another helmet or a shoulder pad at an oblique angle along a path 1107. During the brief period that the objects 1105 and 1106 are in contact, the first object 1105 slides over the second object 1106 as they compress together. This tangential sliding motion 1108 is opposed by the sliding friction force, which exerts a torque on the first object 1105, causing it to rotate forward, as indicated at 1109. When the objects 1105 and 1106 separate after they compress and decompress, the first object 1105 rebounds at a generally different oblique angle along a path 1110, with a velocity and spin determined by the incident velocity, the masses and curvatures of the objects 1105 and 1106, the coefficient of restitution between the objects, and the coefficient of sliding friction between the objects. This natural interaction, which proceeds according to the laws of free-body mechanics, is very different from the unnatural impacts produced by the prior art testing devices. In terms of this example, these devices artificially constrain the incoming object to rebound in exactly the same direction as the initial direction, with no acquired rotation. A consequence of this is that the force and acceleration profiles associated with the impacts created by constraining testing equipment do not correctly replicate the profiles created in game impacts. The artificial constraining forces act on impacted helmets and distort the shape and magnitude of the measured force profile from the profile that would result from a natural impact.

As explained above, one of the consequences of using constrained impacts to test helmet performance is that the forces and torques exerted on a helmet arising from such impacts are different from those arising from unconstrained impacts at the same location and velocity. The perpendicular components of these forces are often similar, but the (torque causing) tangential components are usually very different. The tangential component of a constrained force depends on the impact speed and the masses and elasticities of the colliding bodies, whereas the tangential component of an unconstrained force depends in addition on the more detailed properties of the bodies such as their curvatures, moments of inertia, and sliding friction coefficients. Depending on the values of these quantities, the applied tangential constrained force can be considerably more than or less than the tangential unconstrained force. The use of constrained impacts therefore introduces large and uncontrolled elements of uncertainty into the force and torque measurements. Such impacts can therefore not be expected to provide an accurate description of realistic game impacts.

Another way of stating the problems associated with using constrained impacts is that such impacts impart unphysical forces and torques onto a struck body (forces that are not created in game collisions), in addition to the physical forces and torques imparted in an unconstrained impact. These artificial forces are those required to maintain the constrained motion of the impacting body and to compel the impactor to rebound in the same direction as the incident direction. The total force exerted on a body in a constrained impact is the vector sum of the physical force and the constraining force. It can be significantly different from the physical force in both magnitude and direction.

Discussed hereinafter are force profiles arising from both constrained and unconstrained impacts onto a helmet from the same impactor at the same location and speed. These profiles are seen to differ from one another in impartant ways, demonstrating how constrained impacts lead to unreliable impact data. Slow motion videos also demonstrate the physical consequences of free body impacts described above. These show that rebound direction differs significantly from incident direction and that a bounding impactor acquires a rotational motion.

The method and associated devices of the present invention take into account the above described physical effects during impacts, such as sliding and rotating, and provides for measuring transmitted forces, which is not included in prior art approaches.

The present invention provides laboratory football helmet testing apparatus and methodology that closely replicates or simulates impacts between football players that occur in football games and practices. The invention further contemplates a comparison of the impact data measured in the lab test with those measured in the field, under the same initial conditions. The lab conditions (impact locations and velocities, impactor and target weights, constraints, etc.) are all controllable and measurable, but the field conditions must be taken as they occur. The data on field impacts is correspondingly much less accurate and detailed.

One category of field data consists of measurements recorded on accelerometers placed at various locations on the inside of helmets. These data specify the magnitudes and approximate locations of the impacts, but do not specify the impact velocities, the helmets used, or the relevant body-part weights of the players. Another category of field data consists of impact speed measurements taken from video recordings of game impacts that resulted in concussions. These speed measurements were, however, not accompanied by measurements of the corresponding head accelerations. These head accelerations were therefore estimated by using lab measurements of the head accelerations arising from the measured impact speeds.

None of these investigations have correlated the speed or acceleration measurements with the weights of the players involved. Also, it is necessary to supplement the speed measurements with lab acceleration measurements in order to estimate the associated accelerations, and to supplement the acceleration measurements with lab speed measurements in order to estimate the associated speeds. Furthermore, without the associated weight information, it is not possible to accurately determine the speed or acceleration levels that are likely to cause MTBI. For example, an impact on a player at a measured speed that did not result in a concussion could have resulted in a concussion in a player with a smaller head weight.

The testing of helmets in a lab setting serves two important functions: (1) It provides information that gives a more complete description of field impacts by supplementing the directly measured field impact data with lab impact data, and (2) it provides a framework for the testing and certification of helmets in order to insure that compliant helmets provide as much user protection as possible. For each of these functions, it is crucial that the lab testing impacts replicate the free-body field impacts as closely as possible. A preferred way of accomplishing this pursuant to the present invention is to have a lab impactor moving as a free body during the entire impact time, and to have the target (e.g., helmet and head model, with or without torso, attached to one another) free to react in the way that a free body reacts. In addition, the present invention contemplates that impactor and target weights and elastic constants to cover the entire range of encountered field values. In particular, preferred impacting weights are relatively large, and preferred target weights are relatively small, in order to maximize the target acceleration that occurs at a given impact speed. If these colliding elements create a head acceleration profile that is considered safe, then the elements of all occurring weights will do the same, whereas the converse is not true.

Lab measurements are of course much more informative than field measurements. For each impact, using a specified impactor and target, the impact velocity and location, the helmet used, and the head weights are known, and the resultant head accelerations (and preferably other quantities such as transmitted forces) can be accurately measured and used to evaluate performance metrics such as peak accelerations and severity indices.

Figure 3:
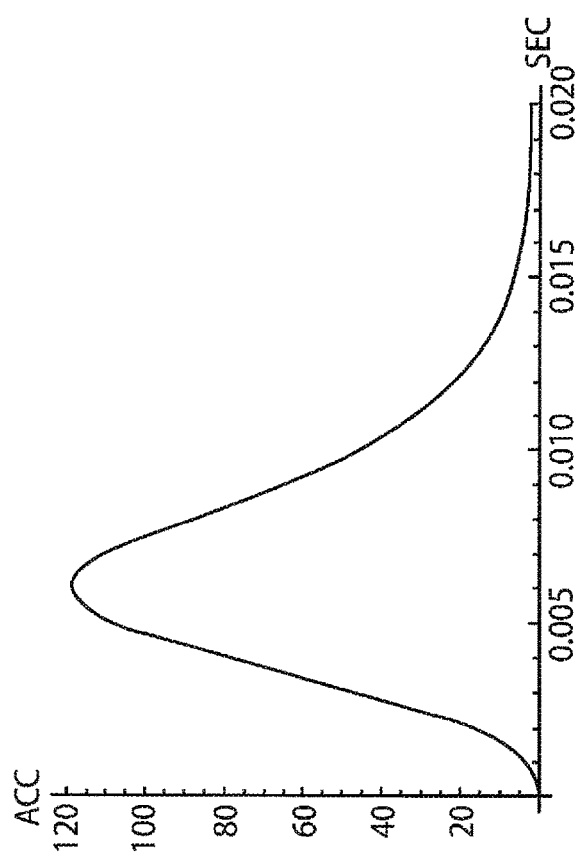
FIG. 3 is a plot of acceleration v. time during an impact of objects such as diagrammed in FIG. 2.

To compare lab and field measured accelerations in a model-independent way, metric values derived from the respective acceleration and force data can be directly compared. Some relevant metrics include the peak and average recorded accelerations, the SI, the impact duration, and the Fourier series expansion coefficients of the acceleration data. As explained above, the prior-art testing devices create impacts that differ significantly from field impacts. These differences are not always apparent from comparisons of the acceleration profiles of the lab and field impacts corresponding to the same impact speed. Plots of both profiles have the same general form exhibited in FIG. 3, in which the absolute value of the acceleration (measured in units of the acceleration of gravity g) is plotted against the time evolved during the impact. The typical plot in both cases curves upward from the start of the impact, reaches a maximum, and then curves back downward, initially more rapidly and then more gradually. The differences between the profiles are in the details, and the validity of a testing method is determined by how well it minimizes these differences.

These issues are not academic. Since measured field acceleration data are usually not accompanied by the corresponding impact velocity values, lab data are used to estimate these velocity values from the measured field acceleration data. If the lab data are obtained from unrealistic highly constrained impacts, the derived relation between lab acceleration values and lab impact velocity values cannot be reliably used to estimate field impact velocity values from field acceleration values.

The impacts that arise in preferred embodiments of testing equipment pursuant to the present invention are much more realistic. Impactor and target as disclosed herein are preferable completely or substantially free and unconstrained before, during, and after an impact.

Of course, any lab device that attempts to replicate actual collisions between game participants will necessarily do so in an approximate way. The advantages of well-executed lab measurements are that they are controlled, accurate, and repeatable, but since they necessarily involve simplifications and compromises, they cannot be expected to predict perfectly the outcomes of the highly complex collisions between living systems. The lab equipment comprises a given fixed mechanical system, with a limited number of possible configurations and adjustments, whereas all humans differ from one another in infinitely many ways, including differences in their body structures, their mental and physical response mechanisms, and their instantaneous state of motion and muscle tension.

Given inherent limitations of lab devices, it is important that helmet testing methods at least provide impacts that reproduce unconstrained free body collisions as closely as possible. Because the existing methods fail to provide such impacts, there is a definite need for more realistic testing methods. In the following, preferred embodiments of such methods are described.

Figure 4:
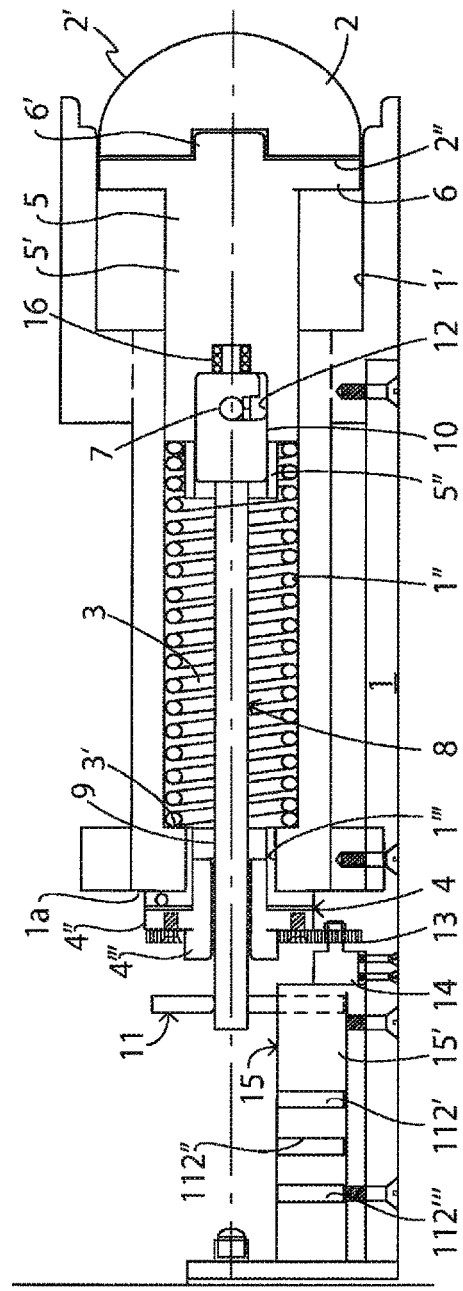
FIG. 4 is a schematic side elevational view, partially in longitudinal cross-section of a cannon device in accordance with the present invention, for implementing an associated testing method also in accordance with the invention.

FIG. 4 depicts a cannon device that propels a helmet-shaped impacting element 2 (impactor) at a target body (see, e.g., FIG. 20) consisting of a helmet attached to an instrumented head-neck-torso model. Although the cannon propulsion mechanism can be based on compressed gas, hydraulics, or other similar materials, preferred embodiments are spring-loaded devices. In these cannons, the impactor is in contact with a spring that is compressed and then released in order to propel said impactor towards the target. The target body is preferably initially supported from above by attached thin wires or similar elements. (FIG. 20, below.) The target body is released prior to the impact or after a small force is applied to it, so that both the impactor and target are completely free during the impact.

Figure 5:
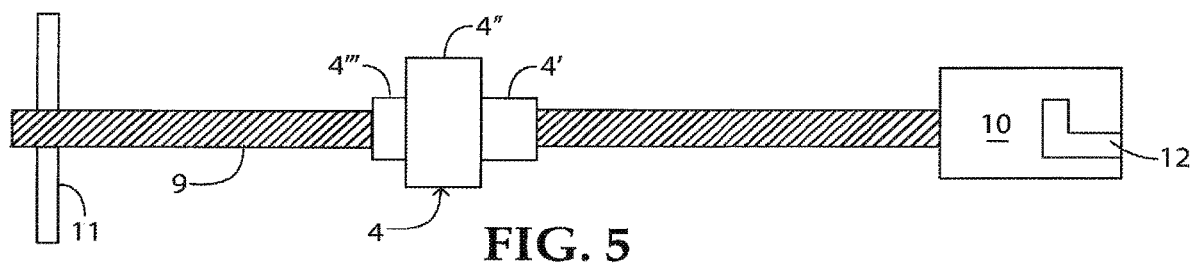
FIG. 5 is a schematic side elevational view of a compression/release mechanism included in the cannon device of FIG. 4.

The cannon device of FIG. 4 comprises a cannon body 1 consists of three concentric cylindrical horizontal chambers 1', 1", 1'" connected in series. A forward (target-facing) largest diameter (front) chamber 1' holds an impactor 2, a smaller diameter central chamber 1" holds a concentric helical compression spring 3, and a backward-facing even smaller diameter (rear) chamber 1'" accommodates a concentric flange nut winding cylinder 4. The front chamber 1' has a diameter slightly greater than that of the impactor 2, and the central chamber 1" has a diameter slightly greater than that of the spring 3. A compression/propulsion element 5 includes three cylindrical sections connected in series and is positioned between the impactor 2 and the spring 3. A forward section of this propulsion element 5 is a disk 6 that slides within the forward body chamber 1' and that has a slightly smaller diameter than the diameter of the forward chamber 1'. A central section of the propulsion element 5 is a hollow cylinder 5' that slides within the central body chamber 1" and that has a slightly smaller diameter than the diameter of the central chamber 1". This section 5' extends into the front chamber 1' and is attached to the disk 6. A rear section of the propulsion element 5 is a hollow cylinder 5" having an inner diameter equal to that of the central section 5' and having outer diameter slightly less than an inner diameter of the spring 3, so as to form a circular lip or shoulder around which the spring is seated. A perpendicular cylindrical holding rod 7 traverses the vertical center of the central section 5' and is attachable to that section. This rod 7 extends out of the central chamber 1" of the cannon body 1 through horizontal slits (not shown) in the side of the chamber wall. The spring 3 is compressed when rod 7 and attached compression/propulsion element 5 are pulled backward. The impactor 2 has a curved convex forward-facing surface 2' and a flat backward-facing surface 2" that initially rests against the slidable disk 6 in the front chamber 1'. A concentric cylindrical knob 6' is attached to the center of the disk 6 to help support the impactor 2 by residing within a cylindrical indentation 2'" at the center of the flat rear side 2" of the impactor. Another component of the cannon is a compression/release element or assembly 8, illustrated in detail in FIG. 5. This assembly 8 comprises a horizontal threaded rod 9 with a hollow forward-facing locking/release element 10 attached at the front end and a perpendicular or transversely oriented turning/constraining rod 11 attached near the back end. In between these elements, and mounted to the rod 9, is a flange nut 4 with internal threads that match those of the rod 9. The locking element 10 is a blind mate or bayonet mount type of connector, in the-form of a hollow cylinder provided with two diametrically opposed L-shaped forward-facing slots 12. This element 10 slides within the rear sections 5' and 5" of the propulsion element 5 and attaches to the transverse holding rod 7 when pressed against this rod and rotated, causing the rod to become set within an upper or rearward section of each L-slot 12. The rotation of the locking element 10 is effected by rotation of the turning/constraining rod 11 whose orientation is aligned with the locations of the L-slots 12 in the locking element 10. When the locking element 10 is locked onto the holding rod 7, the attached threaded rod 9 extends backward through the center of the spring 3, through the flange nut 4, terminating outside of the cannon body 1. The flange nut 4 has three cylindrical sections 4', 4", and 4'" attached in series, each section having a central hole with threads that accommodate the threaded rod 9. The forward section 4' fits into the rear body chamber 1'", and, having a slightly smaller outer diameter than the diameter of this chamber, is rotatable therein. The central section 4" of the flange nut 4 has a larger diameter that acts as a stop preventing the inserted forward section 4' from moving farther forward into the rear chamber 1'" of the cannon body 1. The rear section 4'" of the flange nut 4 is an element that can be used to rotate the nut. This rear section 4'" can, for example, be hexagonal, to accommodate a wrench, or can include a gear 13' with cogs (not separately designated) that mesh with a gear 13 connected to a driven shaft 14' of an electric motor 14.

To operate the cannon 1, the compression/release device or element 8 is inserted into the rear of the propulsion element 5 until the locking/release cylinder 10 rests against the holding rod 7. The turning/constraining rod 11 is then oriented such that the forward ends or mouths (not separately designated) of the L-slots 12 in the locking/release cylinder 10 are aligned with the holding rod 7. The cylinder 10 is then moved forward onto the holding rod 7 and rotated by using the turning/constraining rod 11 until the locking element 10 locks onto the holding rod 7, as described above. The turning/constraining rod 11 is aligned with the slot locations in the locking element 10 such that the rod 11 lies in the vertical direction (or any chosen direction) after the holding rod 7 is locked into place. The vertical turning/constraining rod 11 is then constrained to slide within a guide rail 15 so that the rod 11 and the attached locking element 10 can no longer rotate. (One vertical longitudinal side wall 15' of the guide rail 15 has a vertical slit 112' through which the turning/constraining rod 11 can rotate into the rail as the locking element 10 is locked onto the holding rod 7 and has one or more slits 112" and 112'" farther back in the same side wall 15' of the guide rail 15 through which the rod 11 can rotate back out of the rail.) After the compression/release device or element 8 has locked onto the holding rod 7 and attached propulsion element 5, the flange nut 4 is rotated on the threaded rod 9 so that the flange nut moves forward until its front section 4' has moved into the rear chamber 1'" of the cannon body 1 and its central section 4" rests against a transverse outer surface 1a at the rear of the cannon body 1. The flange nut 4 is then rotated in place, pulling the threaded rod 9 backward and moving the propulsion element 5 locked onto it back with it. (Thrust ball or roller bearings, not shown, can be inserted between the central section 4" of the nut 4 and the adjacent rear cannon surface 1a to facilitate the rotation of the nut 4.) This motion compresses the spring 3 until the length of the spring has decreased a desired amount, at which point the vertical turning/constraining rod 11 has moved back within the guide rail 15 to a position in line with one of the back slits 112" or 112'". The turning/constraining rod 11 can then be rotated through that slit 112" or 112'" out of the rail 15, causing the locking element 10 to rotate in the same direction so as to release the holding rod 7. The concomitantly released compressed spring 3 then rapidly expands forward, propelling the propulsion element 5 and impactor 2 forward. The forward motion of the propulsion element 5 must be stopped after the spring 3 returns to its rest length, at which time the element 5 and the impactor 2 reach their maximum speed. There are many ways to accomplish this. One way is to couple the rear of the spring 3 to the rear of the central body chamber 1" and to couple the front of the spring 3 to the propulsion element 5. Then the spring 3 will itself bring the propulsion element 5 to rest. A preferred way is to attach rear-facing damping springs 16 to the outer surface of the cannon body 1, in line with the holding rod 7, at positions such that the rod will impact receptacles attached to these springs after the propulsion spring has returned to its rest length. This mechanism is illustrated in FIG. 4. Once the propulsion element 5 starts to slow down due to one of these restraining mechanisms (or an equivalent one), the impactor 2 will depart from the adjacent disk 6 and proceed forward at a preselected speed.

The propulsion of impactor 2 proceeds as follows. (A) The impactor 2 is inserted into the forward body chamber 1' so that the impactor rests against the sliding disk 6 attached to the front of the propulsion element 5. The back end of the propulsion element 5 rests against the forward end of the un-compressed spring 3, and the back end of the spring 3 rests against a lip or shoulder 3' at the interface between the central body chamber 1" and the rear body chamber 1'". (B) The compression/release device 8 is then inserted forward into the rear of the cannon body 1 until the attached locking element 10 moves onto the holding rod 7. (C) The turning/constraining rod 11 is then used to rotate the locking element 10 so that the same locks onto the holding rod 7 and the turning/constraining rod 11 has rotated through the forward slit 112' into the guide rail 15. (D) The flange nut 4 is then rotated forward into the rear chamber 1'" of the cannon body 1 until its central section 4" rests against the back side 1a of the chamber (or against adjacent bearings). (E) The flange nut 4 is then rotated further (by hand, using an attached lever, or by an electric motor attached to it by suitable gears) causing the contained threaded rod 9 and attached locking element 10 to move backward. This movement pulls the holding rod 7 and attached propulsion element 5 backward, causing the spring 3 to compress. (F) The rotation of the flange nut 4 and consequent compression of the spring 3 continue until the spring is compressed to the desired length (as determined by the chosen impactor speed). At this point, the vertical turning/constraining rod 11, which has moved backward in the guide rail 15, is adjacent to one of the rear slits 112" or 112'" in the guide rail 15. (G) The turning/constraining rod 11 is then rotated out of the rail 15 through the adjacent slit 112" or 112'". This rotates the locking element 10 so that the holding rod 7 is released and the spring 3 expands forward, propelling the propulsion element 5 and attached impactor 2 forward. After the expanding spring 3 reaches its rest length, the speed of the attached propulsion element 5 begins to decrease as described above, and the impactor 2 separates from the disk 6 and continues forward at the preselected speed as a free body.

Figure 6:
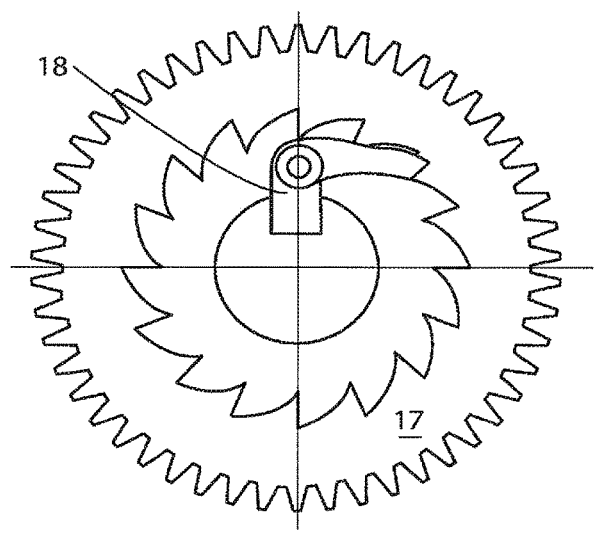
FIG. 6 is a front elevational view of a ratcheting flange nut optionally included in the compression/release mechanism of FIG. 5.

The various elements in the above preferred embodiment were described in detail, but the use of alternative elements will be apparent to people skilled in the art. The inventive use of a spring-loaded cannon 1 to propel a free impactor 2 towards a free target can be implemented in a variety of ways. The above embodiment is efficient and effective because it uses the same device to lock the spring 3 onto the propulsion element 5 located between the impactor 2 and the spring 3, to compress and release the spring 3. This device uses the rotation and translation of threaded rod 9, respectively executed by turning/constraining rod 11 and flange nut 4, to perform these functions. In the translation mode, the rod 9 is prevented from rotating by use of a guide rail 15 that constrains the perpendicular turning/constraining rod 11 attached near the back end of the threaded rod 9. An alternative method to transition between the rotation and translation of the threaded rod 9 is to incorporate the transition operation into the flange nut 4 itself, as a ratcheting mechanism. Such a ratcheting flange nut 17 is illustrated in FIG. 6. The mechanism allows the nut 17 to turn freely in one direction, to pull back the threaded rod 9 and compress the spring 3, but prevents the nut 17 from turning in the opposite direction on the threaded rod 9. When the nut 17 is rotated in this opposite direction, it locks into a longitudinal slit 18 in the inserted threaded rod 9 and rotates the attached rod in the same direction. This rotation unlocks the propulsion element 5 and releases the compressed spring 3. This mechanism thus enables the nut 17 to pull the rod 9 backward to compress the spring 3 when the nut 17 turns in one direction and to unlock the holding rod 7 and release the compressed spring 3 when the nut 17 is turned in the opposite direction. If this device is used, the guide rail 15 is not necessary to prevent the rod 9 from rotating but can still be included as a safety mechanism to prevent the accidental release of the compressed spring 3.

Another option is to forgo the simplicity of using the same device 8 to lock, compress, and release the spring, and use a separate device to hold and release the spring 3 after compression thereof. Such a separate device is illustrated in FIGS. 7A-7C. This device consists of a series of gears 19 attached adjacent to each side of the cannon body 1. These side gears 19 are used to rotate a cylinder 20 with a slot 21 that locks onto the inserted holding rod 7 after the spring 3 is compressed. After the holding rod 7 is locked into holding chamber or slot 21 of cylinder 20, which is connected to the gears 19, the compression/release mechanism 8 is unlocked from the bar 7 and removed from the cannon 1. The rod 9 and spring 3 can then be released by rotating the side gears 19 in the opposite direction. The rotations of the side gears 19 can be implemented by using an attached lever (not shown) or an attached electric motor 22.

Figure 1:
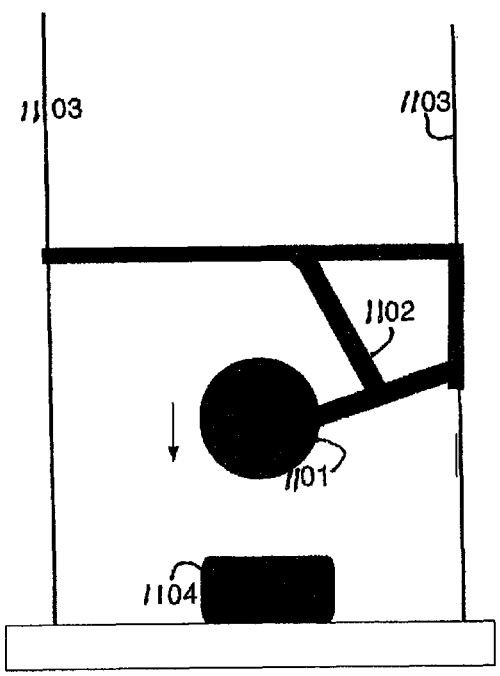
FIG. 1 is a diagrammatic elevational view of a prior art device for testing helmet safety.

In the NOCSAE-style helmet drop, illustrated in FIG. 1, the falling head/helmet 1101 is guided downward and then back upward by two stiff vertical wires 1103. These wires 1103, together with the aluminum attachment frame 1102, prevent the rebounding head/helmet 1101 from rotating and changing direction as it would in an actual field impact. The advantages if this system are its simplicity and ease of use. The disadvantages are the unnatural constraints and the infinite weight of the target 1104. The present improvement of such a system, shown in FIG. 8, reduces the constraint disadvantage, while maintaining the target weight disadvantage and the simplicity advantage. The two vertical constraining wires 1103 are replaced with a single vertical central tube 31 attached to a mounting plate 32 at an upper end. A concentric external tube 33 of larger diameter slides with minimal friction down the internal central tube 31, guided by smooth elastic spacers 34 attached to the central tube. A head model with an attached test helmet 35 is attached to a support 36 at a bottom end of the outer or external second tube 33. After the outer tube system 33 is raised to a desired height and allowed to fall onto a stationary solid anvil 37, the head model with helmet 35 can rebound in a different direction and rotate owing to a compression of the elastic spacers 34 that separate the inner or central tube 31 and the outer or external tube 33. The elasticity of the spacers 34 is chosen to be stiff enough to guide the falling outer tube 33 downward, but soft enough to allow for a relatively unconstrained rebound. Although this rebound is somewhat constrained by the resistance of the elastic spacers 34 and limited by the geometry of the system, the system is a significant improvement of the completely constrained NOCSAE helmet drop system.

Figure 8:
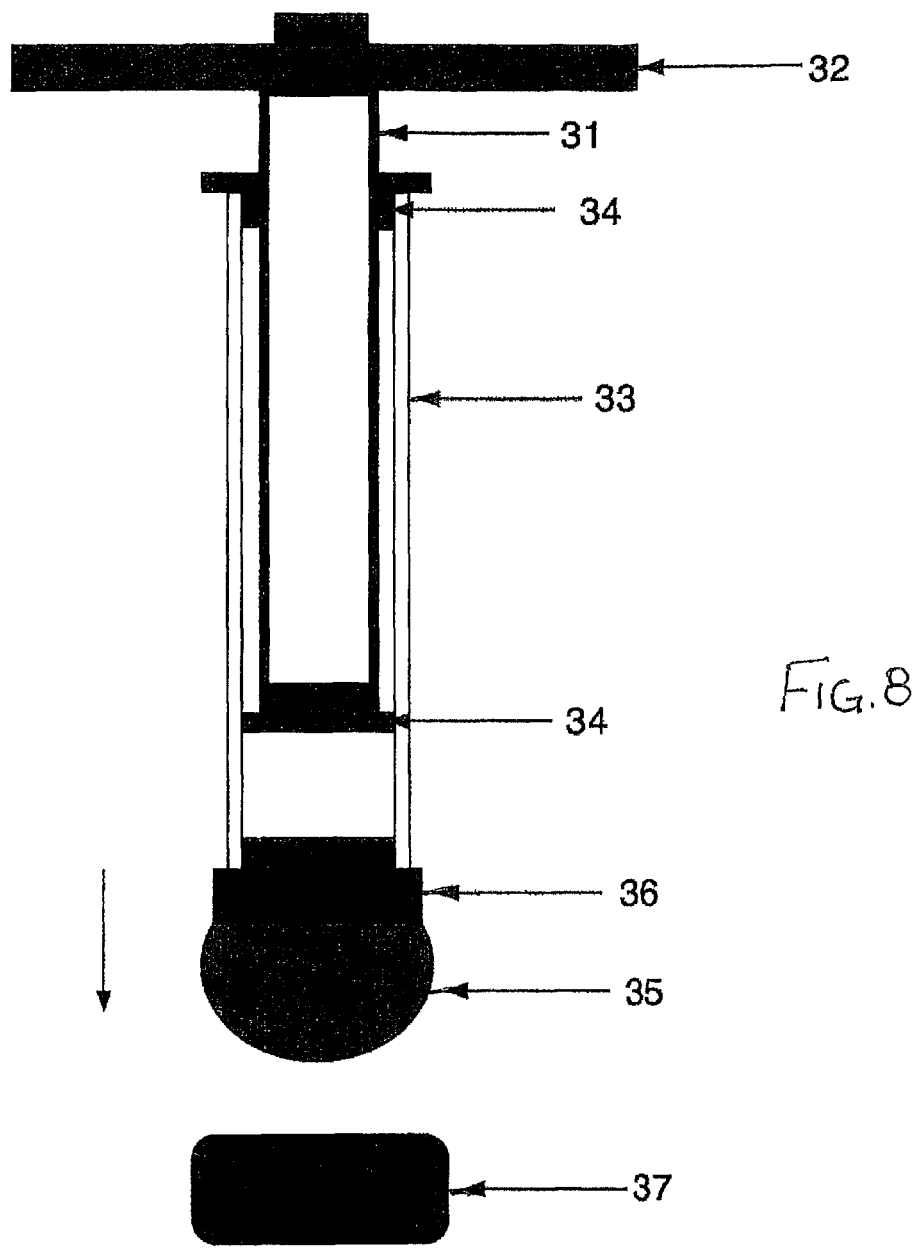
FIG. 8 is a schematic side elevational view of a helmet testing apparatus in accordance with the present invention, dropping a helmet onto an anvil.
Figure 9:
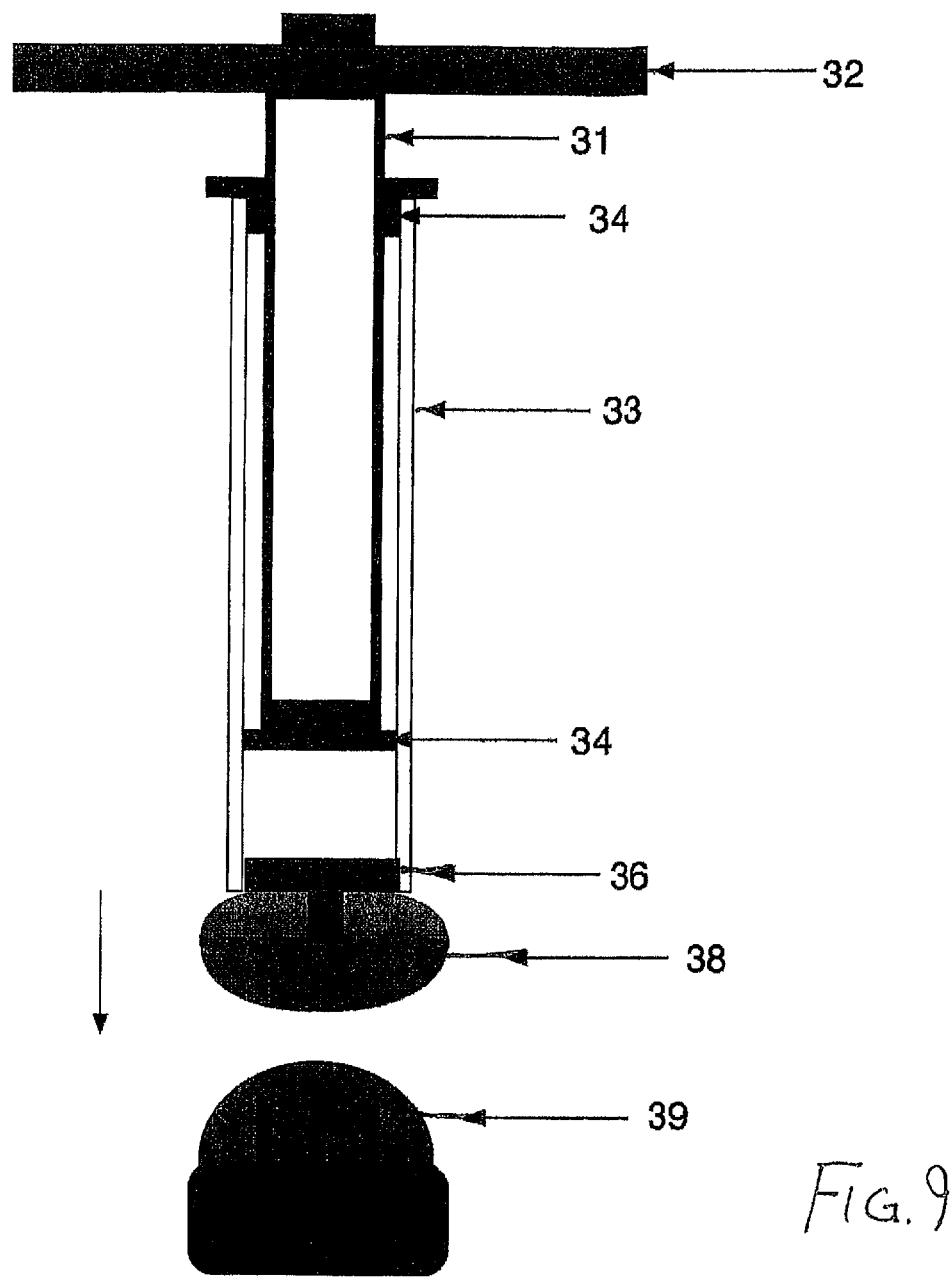
FIG. 9 is a schematic side elevational view of a helmet testing apparatus in accordance with the present invention, dropping an impacting element onto a helmet.

The concentric tubes impacting system of FIG. 8 can be fundamentally improved by introducing modifications illustrated in FIG. 9. In this system, a falling impactor 38 is used instead of the falling head/helmet 35, and the anvil target 37 is replaced with an instrumented head/helmet target 39. This is much more realistic than both the NOCSAE-style helmet drop system of FIG. 1 with its strongly constrained impact on a fixed target 1104 and the improved helmet drop system of FIG. 8 with its lightly constrained impact on a fixed target in that both the impactor 38 and the target 37 have finite weight. This system will also enable the helmet/head target 37 to be instrumented with sensors that measure the magnitudes of the forces transmitted through the helmet onto various locations on the head model.

In the testing system of FIG. 9, the falling tube 33 with attached load or impactor 38 slides with minimal friction down the fixed inner tube 31 onto the instrumented helmet 39 being tested. As above, this implements an approximately unconstrained impact and allows for an approximately unconstrained rebound immediately after the impact.

Figure 10:
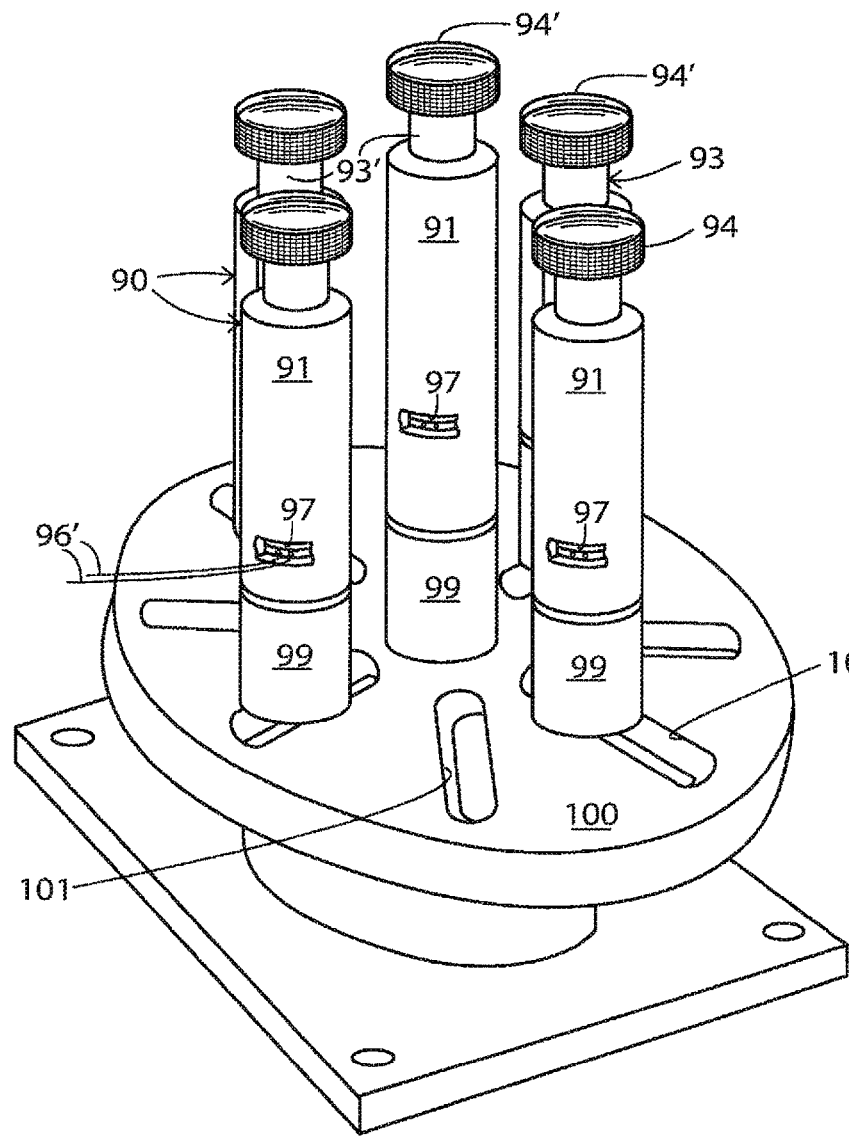
FIG. 10 is a schematic perspective view of a sensor assembly in accordance with the present invention, incorporable into a target body including a helmet attached to a head model.
Figure 11:
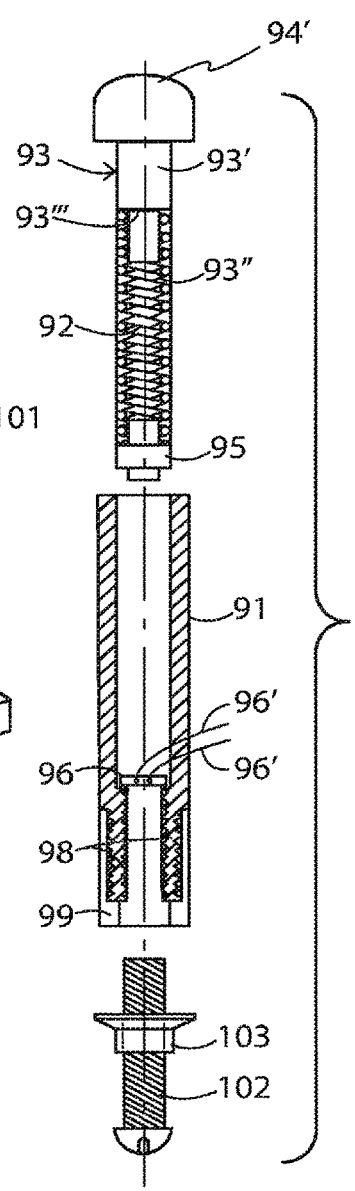
FIG. 11 is an exploded side elevational view, partly in longitudinal cross-section of a sensor unit included in the sensor assembly of FIG. 10.

A preferred configuration of each internal force sensor unit 90 of a plurality of such units incorporated into the test helmet 39 for FIG. 9 is depicted in FIGS. 10 and 11. Each individual sensor unit 90 consists of a vertical cylindrical upper tube 91 containing a central spring 92. (The springs 92 model the elasticity of a player's body and enable the head model 39 to react to an impact in a relatively realistic way.) A solid cylindrical post 93, with a main shaft section 93' slidably inserted within the tube 91, rests on top of the spring 92. An upper end of the post 93 extends out of the tube 91 and terminates in a wider cylinder or head 94 with a convex curved top 94' that is to be placed in contact with an inner surface of helmet 39. Post 93 has a smaller diameter shaft section 93" that extended within spring 92 and that together with shaft section 93' defines a shoulder 93''' that rests against an upper end of the spring 92. A lower end of the spring 92 rests against a contact pin 95 that applies or transmits the force exerted by the compressed spring 92 onto a load cell or sensor 96 under the pin. The load or sensor cell 96 has cords or leads 96' that exit the tube 91 through slits 97 in a sidewall thereof. Upper tube 91 has a threaded bottom section 98 that screws into a threaded concentric lower tube 99 attached to a base platform 100. The height of the sensor unit 90 is adjusted by rotating the upper tube 91 within the lower tube 99, and the position of the unit 90 is adjusted by sliding the lower tube 99 in a radial slit 101 in the base 100. After the unit 90 is positioned within the respective slit 101, the unit is held place by a screw 102 inserted from the bottom surface of the base 100 into the bottom of the lower tube 99. The screw 102 contains a flange nut 103 that is rotated upward to lock the unit 90 in place. The complete device (FIG. 11) consists of a sufficient number of sensor units 90, each residing in a slit 101 in the base unit 100. The slits 101 are positioned in the base 100 such that the device can provide for a uniform and comprehensive coverage of the area of the helmet 39 that is being impacted.

The instrumented head model described above was specified in detail, but alternative constructions will be apparent to people skilled in the art. The basic inventive property of the sensor system of FIGS. 10 and 11 is providing for the positioning the individual measurement units 90 at sufficiently many locations on the inner surface of the helmet 39 to provide an extensive tabulation of the transmitted force distribution.

The helmet testing protocol thus proceeds as follows. The weight and drop-height of the falling tube 33 and load 38 are chosen to achieve the desired force and impact time applied onto the helmet 39. An accelerometer attached to the load 38 measures the force applied onto the helmet 39 as a function of the time elapsed during the impact. The impacted helmet 39 transmits this force onto the heads 94 of the sensor units 90, and particularly via the convex surfaces 94' thereof, and then onto the springs 92 and force sensors 96. These sensors 96 thus measure the force transmitted through the helmet 39 onto the head model at each location. This arrangement supplements the impact acceleration measurements with transmitted force measurements made on the head model. This is important because the totality of these transmitted forces can be larger than the applied force at times during the impact, and because it makes it possible to measure the degree to which the impact force is beneficially distributed over a user's skull by a helmet.

Figure 12:
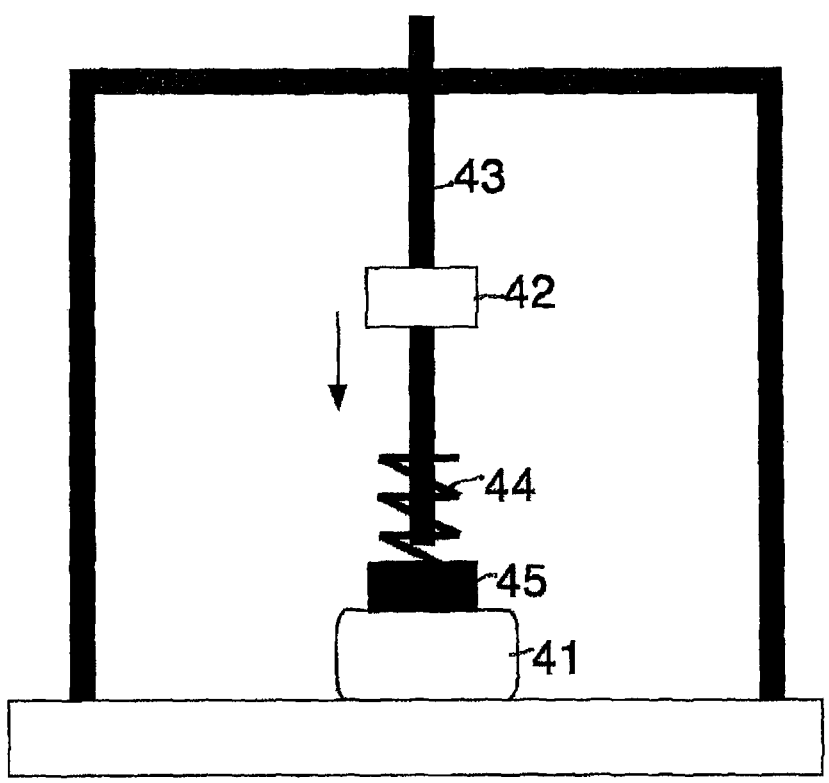
FIG. 12 is a schematic side elevational view of another helmet safety testing apparatus in accordance with the present invention.
Figure 13:
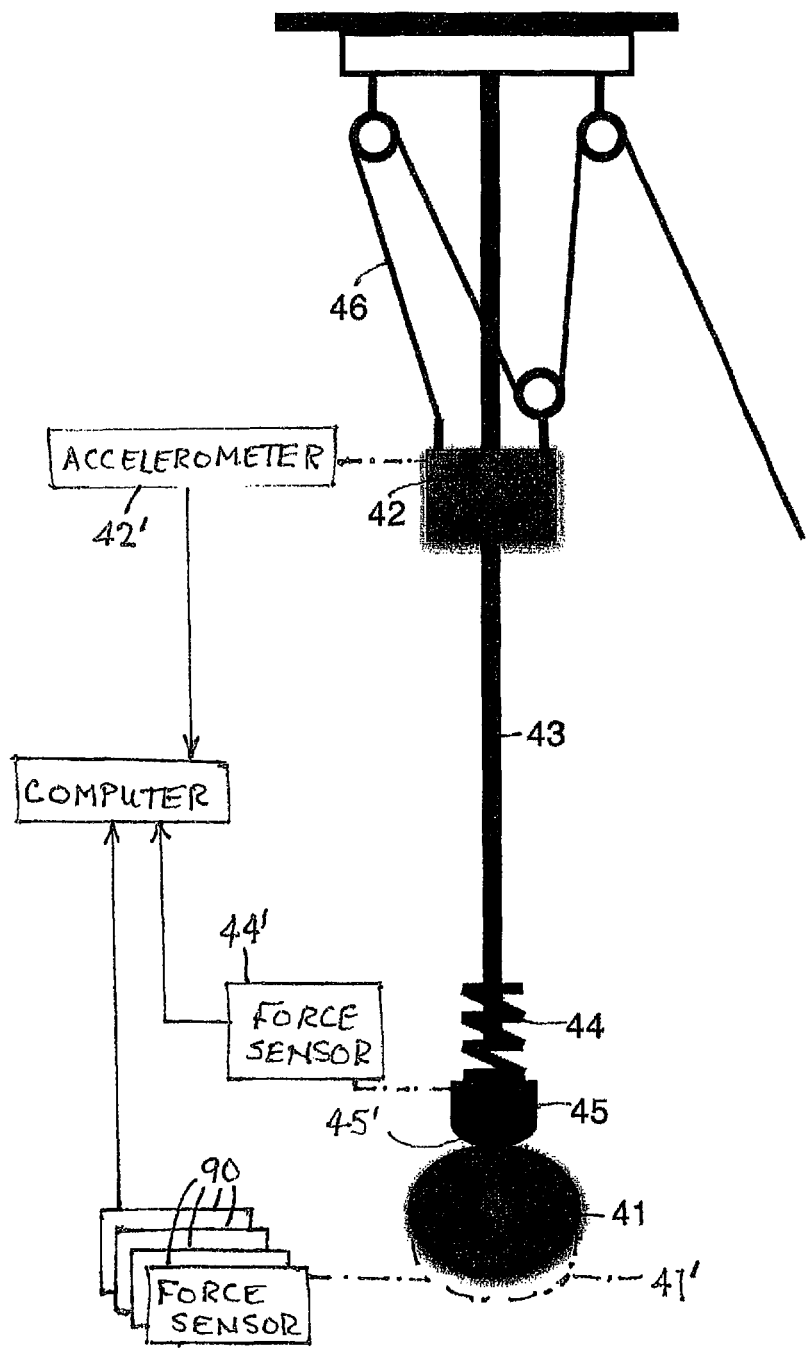
FIG. 13 is a schematic side elevational view of an elaboration of the helmet testing apparatus of FIG. 12.

In a testing system illustrated in FIG. 12, an impact on a helmet 41 is implemented by a flat-bottom load or block 42 with a central hole traversed by a lubricant-sheathed vertical tube 43. Instead of striking the helmet 41 directly, the load 42 strikes an upper end of a stiff spring 44 whose lower end rests within a cavity in upper portion of a suitably-shaped impacting element 45. The load 42 is dropped onto the helmet 41 from various heights (which determine the impact speeds). The load 42 slides down the lubricated vertical tube 43, which enables one to accurately aim the load and control the rebound thereof off of the helmet 41. The falling load 42 strikes the stiff spring 44 attached to the impact element 45, which rests on the helmet 41. The impact is designed to model typical game impacts with regard to impact force and impact time. A preferred embodiment with some modifications is shown in FIG. 13. The guide tube 43 is attached from above, and a rope and pulley arrangement 46 is provided for raising the load 42 to the desired height. The impact element has a rounded lower surface 45'.

The impacts created by the system, of FIG. 13 are substantially unconstrained because the impacting element 45 is not rigidly attached to the falling load 42 but is free to rebound in any direction with any spin that might be acquired during the impact with the helmet 41. The falling load 42 and spring 44 are constrained to rebound back up the vertical tube 43, but the impactor 45 is only lightly constrained during most of the impact duration.

In preferred embodiments, three types of force measurements are made for each impact. An accelerometer 42' attached to the falling weight 42 measures the acceleration verses time profile of the impact. The force exerted on the outside of each helmet 41 during the impact is measured using a sensor 44' attached between the spring 44 and the impactor 45. The recorded data is used to confirm and supplement the data from the accelerometer measurements made on the impactor 45. In the third type of measurement, the actual forces transmitted through the helmet 41 onto a head model 41' are measured. These forces are recorded by force sensors (such as sensor units 90 with load sensors 96) placed at various locations on the model 41', in order to determine the degree to which the helmets 41 are effective in spreading out the applied impact force. The outputs from these sensors 96 are transmitted to and recorded in a computer 200 and converted into graphs or plots of force verses time, as discussed hereinafter with reference to FIGS. 22-28. It is to be understood that the accelerometer 42', force sensor 44', force sensor units 90, and computer 200 are common to many, if not all of the testing apparatus disclosed herein.

The weight of the load 42 and the impact speed (or drop height) are chosen such that the force applied to the helmet 41 and the impact duration are of the order of those encountered in actual game impacts. With these loads and impact speeds, the degree of force reduction provided by the elastic and damping properties of the helmet 41 can be evaluated and compared.

In order to compare the protective abilities of different helmets, it is necessary to impact each helmet in the identical way. With the present apparatus, this means that the impacts must arise from a load 42 of a common weight w dropped onto the spring 44 from the same height h; i.e., impacted at the same initial speed v. (Since the friction between the loads and pole is negligible, v and h are related by v=√(2gh), where g=32 ft/s^2 is the acceleration of gravity.)

Figure 14A:
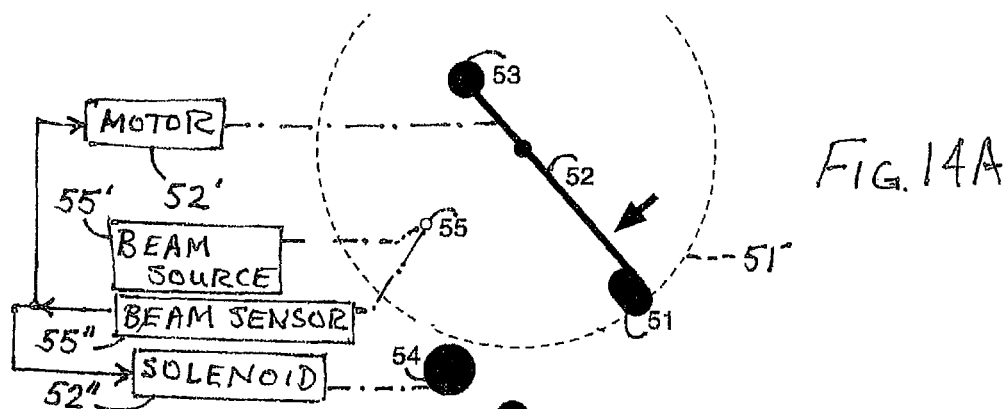
FIGS. 14A, 14B and 14C are diagrams, partially in block form, showing successive stages in the operation of a rotational helmet safety testing apparatus in accordance with the present invention.
Figure 14B:
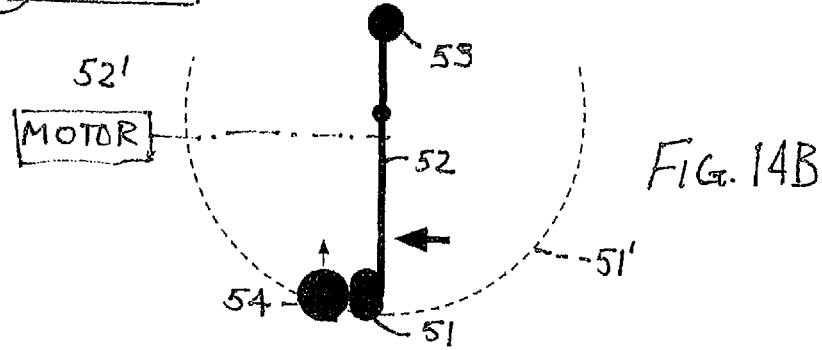
Figure 14C:
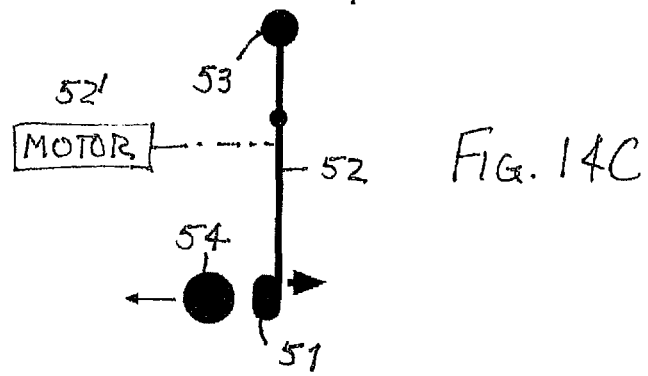

The above-described embodiments of helmet testing systems are relatively simple to construct and utilize because gravity supplies the impactor acceleration, but the created impact speeds are limited by the height of the testing room. (A 20 mph impact requires a falling distance of 13.5 feet.) The rotating systems described hereinafter are more complex but can achieve any relevant impact speed in a relatively small space. A simple embodiment is illustrated in FIGS. 14A-14C. In this device, an impact is created by an impactor 51 attached to a rotating rod 52 powered by an electric motor 52'. A counter weight 53 is attached to an end of the rod 52 opposite the impactor 51 to balance the applied torque. While the rod 52 accelerates to a desired angular speed, which typically requires several revolutions, a target helmet/head/torso 54 is situated out of a path 51' of the rotating impactor 51. Once a desired speed is acquired by the impactor 51, the target or test object 54 is quickly inserted into the rotation path 51' so that, at the completion of the next rotation, the motor 52' will turn off and the impactor 51 will strike the target 54. One way to implement the target insertion is to have the rotating rod 52 break a beam 55 between a source 55' and a sensor 55" immediately after the rod 52 passes the location of the target 54. The signal from the sensor 55" turns off the motor 52' and triggers a solenoid piston 52" which inserts the target 54 into place before the revolution is completed.

Figures 15A, 15B:
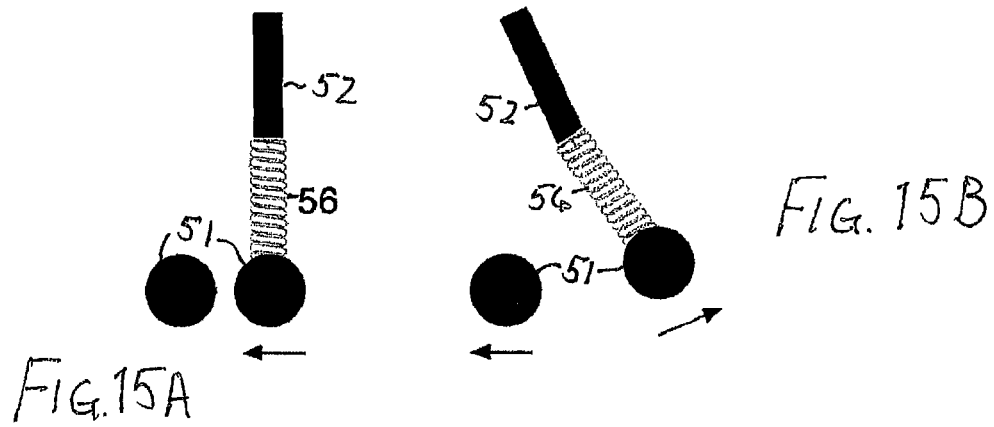
FIGS. 15A and 15B are schematic partial side elevational views of a modification of a rotating arm and attached impactor included in the rotational helmet safety testing apparatus of FIGS. 14A, 14B, and 14C, showing successive stages in the use of operation of the modification.

In the simplest embodiment of this type of system, shown in FIG. 14, the impactor 51 is rigidly attached to the rotating rod 52. The disadvantage of this is that the impactor 51 is constrained to impact and rebound on a circular trajectory. In an embodiment that creates a less-constrained impact, shown in FIG. 15A, the impactor 51 is elastically attached to the end of the rotating rod 52 by a spring 56. The impact trajectory or impactor path 51' is still circular, but the elastic attachment allows for a rebound (FIG. 15B) that is much less constrained.

Figure 16A:
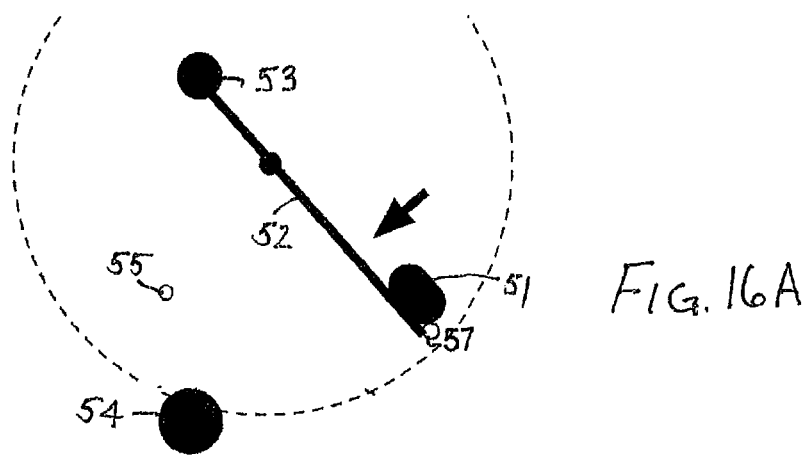
FIGS. 16A, 16B and 16C are diagrams, showing successive stages in the operation of an alternatively modified rotational helmet safety testing apparatus in accordance with the present invention.
Figure 16B:
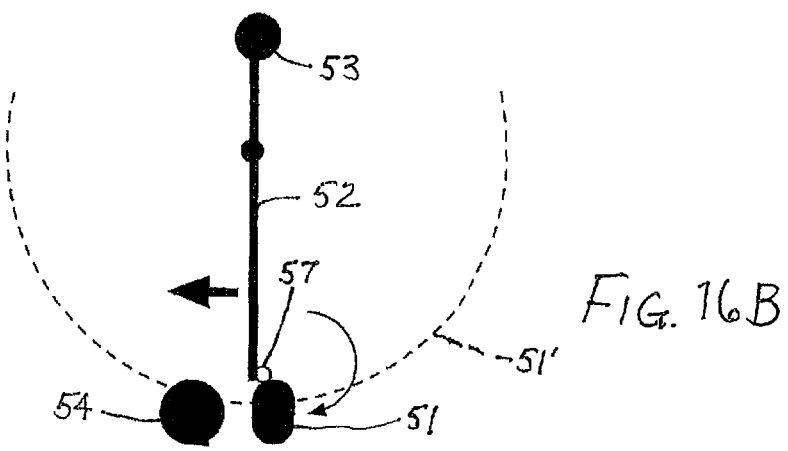
Figure 16C:
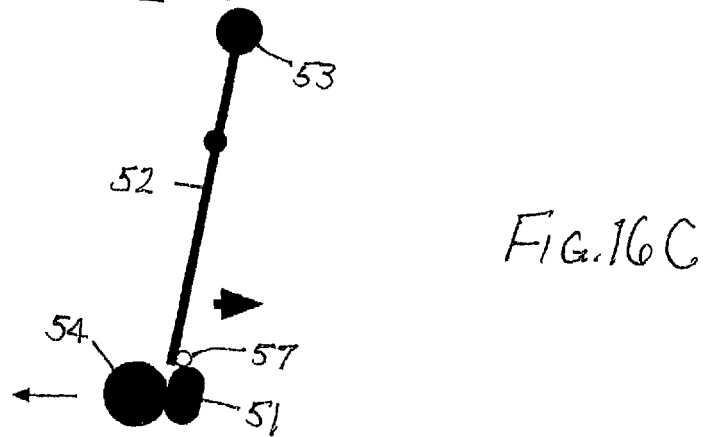

Another option, shown in FIGS. 16A-16C, is to have the target 54 in position at a predetermined impact location from the start of the test, with the impactor 51 connected by a hinge 57 to the end of the rod 52, inclined or rotated towards the center of rod rotation, and locked in place. This solution allows the path 51' of the rotating rod 52 with attached impactor 51 to pass above the impact location of the target 54. After the desired speed is acquired, the impactor 51 is unlocked immediately after the rod 52 passes by the target 52, for example, under control of the above-described beam-breaking mechanism. The centripetal force created by the rotation will then cause the impactor 51 to swing outward about the hinge 57 and in alignment with the rod 52 at the end thereof so that the impactor 51 will impact the target 54 at the completion of the revolution. (The rotation speed of the rod 52 extended by the swung-out impactor 51 will decrease when the impactor 51 swings outward, so the initial speed has to be correspondingly larger.) As above, the impact trajectory or path 51' is still circular, but the hinged attachment allows for a rebound of the impactor 51 that is much less constrained. An option is to have the outer end of the rotating rod 52 inserted into a radial hole in the impacting element 51. The element 51 is held in place during the initial rotations and is released immediately after the rod 52 passes by the target 54, and specifically above the target in the case that the path 51' is in a vertical plane, so that the centripetal force created by the rotation will then cause the impactor 51 to move outward into place at the end of the rod 52 and impact the target 54 at the completion of the revolution. (The rotation speed of the extended rod 52 will decrease when the impactor 51 slides outward, so the initial speed has to be correspondingly larger.

Figure 17A:
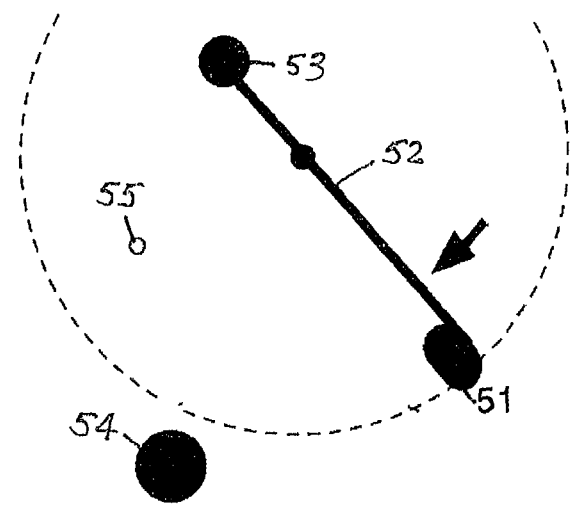
FIGS. 17A, 17B and 17C are diagrams, showing successive stages in the operation of another alternatively modified rotational helmet safety testing apparatus in accordance with the present invention.
Figure 17B:
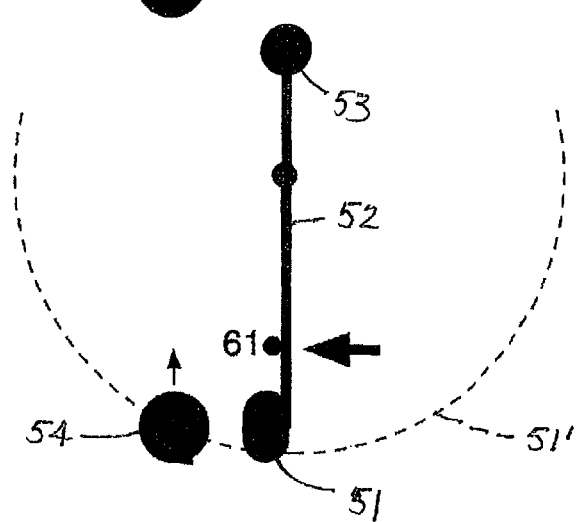
Figure 17C:
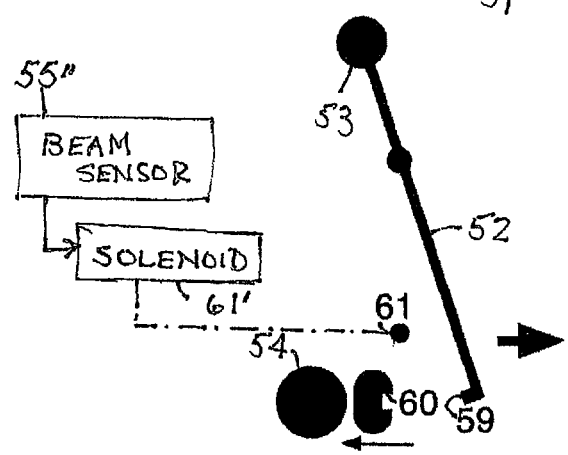

In order to achieve a completely unconstrained impact, the impactor 51 can be set free, that is released from the rod 52, at the bottom of the rotation path 51' before impact with the target 54. In a preferred embodiment of this arrangement, shown in FIGS. 17A-17C the impactor 51 is held in place during the rotations by the inertial force created by the rotation, and by a short perpendicular rod 59 attached to the rotating rod and inserted into a hole 60 in the back face of the impactor. After the desired impactor speed is acquired, the rotating rod is abruptly stopped at the bottom of the rotation path, initiated, for example, by the above beam-breaking mechanism. The signal from the sensor 55" triggers a solenoid piston 61' that inserts a perpendicular stopping rod 61 into the path of the rotating rod 52 while simultaneously turning off the electric rotation motor 52'. This causes the impactor 51 to separate from the rod 52 and continue forward in a straight line (tangential to the circular rotation path 51') with the desired velocity, until it strikes the target 54 that has been inserted upwards as described above, into the rotation path 51' of the impactor 51. In this system, the impactor 51 is completely unconstrained during the impact and is thus free to rebound in any direction with any spin.

In each of the above-discussed rotary test-apparatus embodiments, the impactor 51 and target 54 can be instrumented as in the previous embodiments in order to measure the relevant performance metrics. This will be described in detail hereinafter.

The detailed description above relates to embodiments of devices that propel a free or substantially free impactor towards a target. Now description will be provided of preferred embodiments of free or substantially free targets that are to be struck by these impactors. These targets have three aspects: (1) a target body that consists of a head/neck/torso model with an attached helmet, (2) a mechanism for rendering this assembly as a free or substantially free body before or at the time of an impact, and (3) incorporated sensors that record the forces applied to and through the attached helmet.

The head/neck/torso model should conform to the body of a helmet user in shape, weight distribution, and elasticity. The body-part weights are known, but the amount of the torso that is relevant must be estimated. The relevant amount depends on how far the impact wave extends into the torso during course of the impact. Since, for a given impactor weight and velocity, the forces applied on the target increase when the target weight decreases, it is important to choose the total model weight at the lower end of possibilities in order that the effect on the lightest helmet users is taken into account. If a helmet provides an acceptable measure of safety for the lightest users, it will provide an acceptable measure of safety for the all users, whereas the converse is not true.

The incorporation of body elasticity into the target must also be an approximation. For a human target, this elasticity can be beneficially changed by adjusting the tensions within the relevant body muscles during the impact. However, the chosen strengths and distributions of elastic elements within the target must reflect the possibility that the helmet user will not have the time or ability to make effective adjustments.

Figure 18:
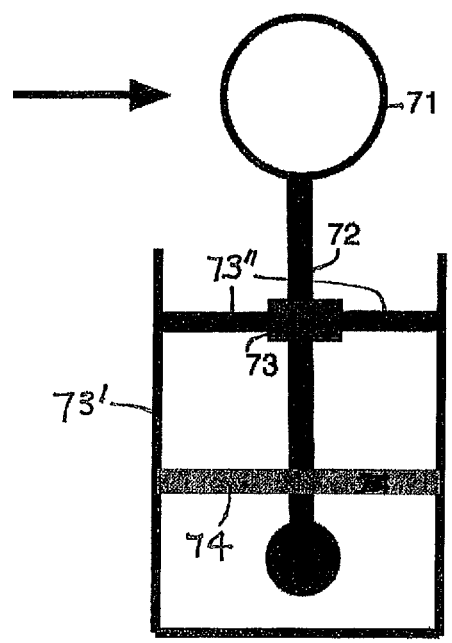
FIG. 18 is a schematic side elevational view of a target body holder or mounting device with springs for stabilization, pursuant to the present invention.
Figure 19:
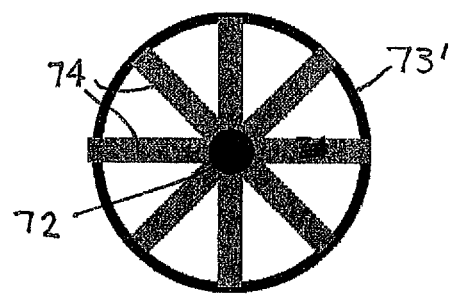
FIG. 19 is a schematic top view of the target body holder or mounting device of FIG. 18.

There are a variety of ways to incorporate elastic elements into the target. The neck of the model can be approximated by a suitable spring or group of springs. It is also possible to support the target with suitably placed springs. Such springs not only model human body elasticity, but the also render the target to be relatively free during the impact. An example of this is shown in FIGS. 18 and 19. In this embodiment, a head model 71 is attached to a vertical rod 72 that is supported in a universal joint 73 mounted to a holder or bracket 73' by rigid arms 73" and steadied or oriented by a plurality of attached horizontal springs 74. In another preferred embodiment, springs can be integrated directly into the force sensors, as above with reference to sensor units 90.

As indicated above, it is desirable for the target to be a completely free body during the impact. A preferred way to accomplish this is to support the target from above with suitably placed strings or light wires before the impact, and to disconnect these supports immediately before the impact or at the start of the impact. An embodiment of such an arrangement is shown in FIG. 20. A cannon 75 (see discussion above with reference to FIG. 4 et seq.) propels an impacter 76 towards a target helmet 77. A head/neck/torso model 78 with the helmet 77 attached thereto is supported by three wires 79 prior to an impact. By adjusting the lengths of wires 79 and/or the orientation of the model 78, the impact can be directed at any location on the helmet 77. The wires 79, initially attached to a holding/release device 80 located above the model 78, are released immediately prior to each impact. A preferred way to do this is to have the wires 79 held by an electromagnet 79' that is switched off when the impacter 76 breaks a beam 79" that is located in front of the helmet 77. (As described above with reference to beam 55, the device may include a beam source 55' and a sensor 55".) Another preferred method is to have the holding/release device 80 configured as a force-sensitive receptacle. An embodiment of such a device is shown in FIGS. 21A and 21B. A piston 81 that is biased or loaded by springs 81' and that supports the wires 79 is initially held in place by a ball-bearing lock 82 placed within a tapered cavity 83 in the sidewall (not enumerated) of the piston. The ball lock 82 extends into an indentation 84 in the wall of a fixed or stationary cylinder 85 that surrounds the piston 81 and a casing 81" thereof. The device 80 is configured so that the piston 81 and attached wires 79 are released when the (threshold) force on the springs 81' exceeds the weight of the target by a small amount. If the impact causes the target to move upwards, the wires are irrelevant and the target acts as a free body, but if the impact causes the target to move downwards or backwards, the force exerted on the device will immediately exceed the threshold and the target 77/78 will again become a free body. More specifically, a downward or backward impact force pulls piston 81 down, compressing springs 81' and freeing ball lock 82 to move out of indentation 84. At that point the piston assembly, including casing 81" falls together with wires 79, model 78 and helmet 77.

The force exerted on the target 77/78 by the impacter 76 during the impact can be measured by accelerometers placed at appropriate locations within the impacter 76 and the target 77/78. It is especially important to record accelerations at the center of mass of the target 77/78 in order to measure the total applied force, and at a head section 78' of the model 78, in order to measure the acceleration of the head. (The total applied force can also be measured by an accelerometer placed at the center of mass of the impacter 76.) In addition to measurements of such applied forces, it is important to measure the forces transmitted through a helmet 77 onto the head model 78', as explained above with reference to FIG. 2. Preferred methods to perform these additional measurements will be described below.

One preferred way to measure the magnitudes and distributions of the forces transmitted through a helmet onto the head of a user is to position a series of force sensors between the inner surface of the helmet and the outer surface of the head model as discussed above with reference to FIGS. 10 and 11. To accommodate the variety of available inner helmet surfaces, the positions and heights of the sensors are preferably adjustable (e.g., see reference designations 91, 99, 101) so that the sensor units 90 and particularly the convex curved tops or upper surfaces 94' thereof can come into contact with the inner helmet surface at each of the desired locations. Also, the elasticity of the head, neck, and torso of a helmet user can be preferably integrated within the structure of the sensors.

Data Analysis

The present helmet testing equipment, unlike the prior art equipment, provides free-body impacts that closely replicate actual field impacts. Now preferred methods of analyzing the data obtained from the use of this equipment will be described. This description entails the definition of performance metrics, both traditional and inventive, that effectively characterize the measured data. These metrics can be used to compare lab and field impacts, to determine the protective capabilities of helmets, and to compare and regulate available helmets.

Data obtained from impacts produced by effective helmet testing equipment can serve three functions. (1) The data can be used to compare lab and field measurements in order to determine if the lab measurements are realistic. (2) After a positive comparison, the lab data can be used to supplement measurements of field impacts in order to more fully characterize these impacts. (3) The lab data can be used to measure and compare the protective capabilities of various helmets in order to help users and associations choose the most protective products.

Parts a and b below define and illustrate metrics that characterize acceleration data. Part c defines and illustrates metrics that characterize transmitted force data.

a. Accelerometer Data

Accelerometer measurements obtained from a single impact provide thousands of data points and so, in order to effectively characterize the impact, the important aspects of these data must be reduced to a relatively small number of performance metric values. The raw acceleration data consists of lists $\{a[i]; i=1, 2, \ldots, N\}$ of acceleration (g) values recorded for each measurement, or, equivalently, lists $\{a(t); t=t1, t2, \ldots, tN\}$ of acceleration values recorded for each measurement time. (If the measurements are made at times equally spaced by an amount dt, then $ti=i \cdot dt$.) Typical values for these quantities are N=2500, dt=0.00001 s, so that tN=0.025 s.

The conventional metrics evaluated from these lists are the maximum recorded acceleration ma, the average recorded acceleration aa, the total impact time tt, and the severity index si. For the above equally spaced measurements, $$a = N \cdot dt$$

$$aa = \frac{1}{N}\sum_{i=1}^{N} a[i]$$

$$si = dt \cdot \sum_{i=1}^{N} a[i]^{2.5}$$

Another important, but often overlooked, metric is the coefficient of restitution (cor). This is the positive ratio of the relative rebound speed v' and the relative incident speed v of an impact:

$$cor = \frac{v'}{v} = 1 - \frac{g \cdot dt}{v} \cdot \sum_{i=1}^{N} a[i]$$

The fractional kinetic energy loss during an impact is $1-cor^2$. During the collision between a helmet and an impacting load, the helmet material is compressed and decompressed, and during this oscillation the material absorbs and releases elastic and thermal energy. The elastic energy is largely returned to the load and the thermal energy is largely dissipated as heat. The more of the incident load kinetic energy that is converted into thermal energy, the smaller will be the force exerted by the load on the helmet.

These metrics ma, aa, si, and cor are measures of the effectiveness of a helmet in reducing the force applied on it during an impact. The helmet for which the magnitudes of these quantities are the smallest is the one that provides the greatest measure of safety for a helmet user.

A plot of the data obtained from a typical impact measured using a prototype of the present equipment is shown in FIG. 22. For these data, the evaluated metric values are $M=\{ma=40.6\ g, aa=17.4\ g, tt=0.025\ s, si=68.5\ s,$
and $cor=0.221\}$.

Previous analyses of impact data have relied on one or more of these metrics, or on related ones. However, these metrics alone do not adequately characterize the impact because they fail to describe important details about the acceleration data. These details include descriptions of the shape, slopes, and local curvatures of the data plots. Additional metrics set forth below supply these missing details.

b. Frequency Analysis

It is proposed herein to tabulate the harmonic frequency (Fourier) spectrum of the acceleration data. The first approximation to these data is given by the Sin function as $a1(t)=c1 \cdot Sin(\omega 1 \cdot t)$, where the fundamental frequency is $\omega 1=\pi/tt$ rad/s. This function of course does not provide an accurate representation of the acceleration list $\{a[i]\}$ plotted in FIG. 22, but an accurate representation of the data is obtained by adding together the first few (n) harmonics, $$an(t) = \sum_{i=1}^{N} ci \cdot \sin(\omega i \cdot t)$$

where the i'th frequency is $\omega i=\pi i/tt$

Figure 24:
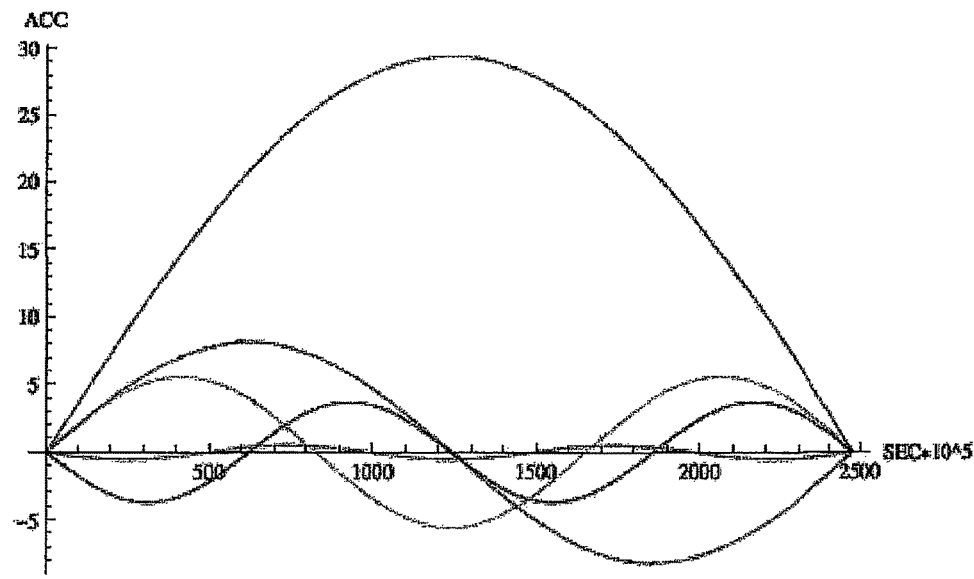
FIG. 24 is a graph of five harmonics used in the fit of FIG. 23 to the acceleration profile of FIG. 22.

An excellent fit to the data plotted in FIG. 22 is provided by the sum a5 of the first five harmonics (n=5). The amplitudes $C5=\{ci\}$ are $C5=\{29.48, 8.20, 5.58, -3.70, -0.52\}$, and the plot of a5(t) vs t is shown in FIG. 23 (in red), superimposed with the data plot. The plots are almost identical. Plots of the five included harmonics are shown in FIG. 24. The list of metric values M={ma, aa, tt, si, cor} together with the list C5 of harmonic amplitudes provide a much more informative characterization of the impact than do the conventional metric values alone.

Using lab equipment described herein, acceleration data can be obtained for any encountered impact speed, and for the range of relevant helmet-head-neck-torso weights (Field impacts have been measured to reach relative speeds as high as 20 mph, and the weights vary from 10 to 30 lbs.) An important application is to use the equipment to determine how the various metric values depend on the various speed and weight values.

c. Transmitted Force Data

The acceleration data described above determine the values of the maximum and average forces applied on a target helmet during an impact. (The applied forces are the product of the applied accelerations and the weight of the impactor.) These values are, however, only a part of the determination of the protective capabilities of a helmet. For a given applied force profile, the helmet that spreads the consequent forces transmitted through the helmet onto the skull of a user over the largest area and largest time interval will offer the best protection. The preferred method to determine this force distribution is to place suitably designed force sensors at various locations on the target skull model under the helmet, as discussed above with reference to FIGS. 10 and 11.

If a total of N such force sensors are used, the preferred metrics that summarize the transmitted force values are the following. (1) The maximum force recorded on each of the N sensors. (2) The largest of these N maximum forces. (3) The sum of these N maximum forces. (4) The maximum of the sum of the N forces as a function of the impact time. The significance of this information is as follows. (1) The maximum force measured on a sensor under the helmet is a measure of how much of the applied force is transmitted through the helmet onto the sensor. It is a measure of the effectiveness of a helmet in spreading the applied force over the body of the player. The smaller the collective values of these transmitted forces compared to the maximum applied force, the more effective is the tested helmet in spreading out the force over the surface of the user's head. (2) In particular, it is obviously desirable to have the maximum individual transmitted force, and the sum of such forces that act together in the same area, significantly less than a force capable of causing a MTBI, even if the maximum applied force is above that level. (3) The sum of the maxim force values is a simple measure of the distribution of the applied force. This sum is usually less than the maximum applied force because it is not possible to cover the entire skull surface with sensors, but it could in principle be larger because the individual maxima can occur at different times during the impact. (4) The maximum of the sum of the transmitted forces (MSTF) is the best force distribution metric because it takes into account the fact that the individual force maxima can occur at different times during the impact. It is highly desirable for the maximum values of at least some of the transmitted forces to occur at different times during the impact so that the combined effect of these forces is diminished and the MSTF is reduced. For a given impact and given applied force profile, the helmet that reduces the magnitudes of this quantity the most is the helmet that provides the greatest measure of safety for the football player.

It is important to note that it is possible for this maximum total transmitted force to be greater that the maximum applied force. This is not possible in an equilibrium situation, but at times during an impact the transmitted force can be greater than the applied force. (We have demonstrated that this is consistent with the laws of mechanics and thermodynamics by constructing mathematical models of the present measurement system and helmet, and numerically solving the corresponding differential equations of motion. The solutions demonstrate the effect in question.)

Figure 25:
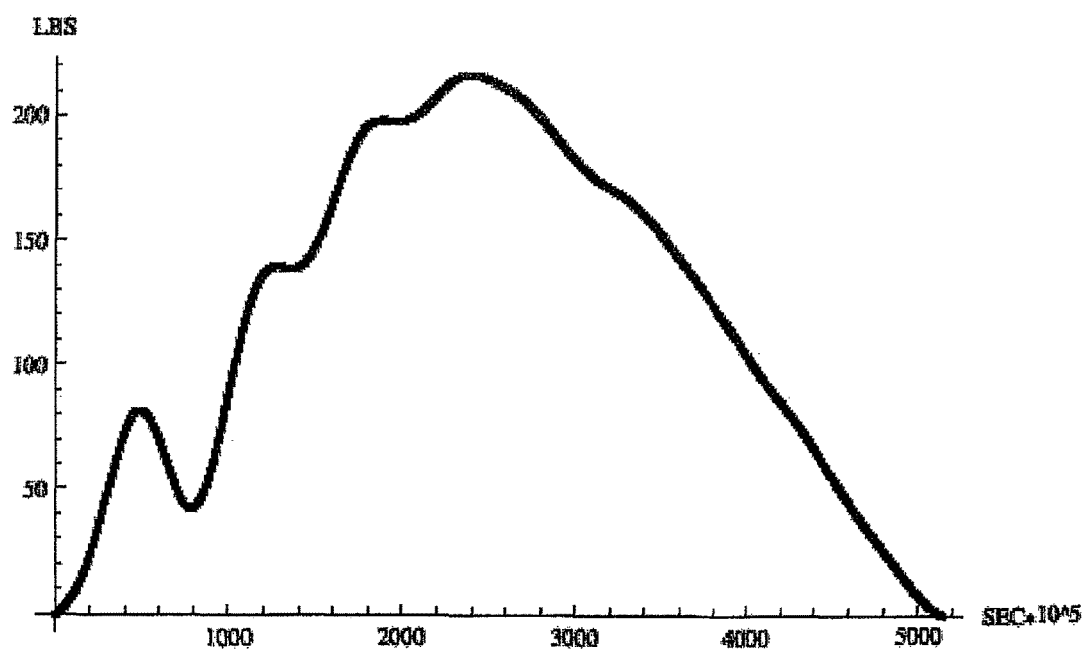
FIG. 25 is a graph of force applied to a test helmet or target body by apparatus in accordance with the present invention, as a function of time.

To exhibit the profiles of transmitted forces, consideration is given to the measured impact whose applied force profile is given in FIG. 25. A total of 5144 force measurements were made during the total impact time of 0.05144 sec. The maximum recorded force of 217.2 lbs occurred after 0.02389 sec. The measured transmitted force profiles from five preferred sensor prototypes (as described in Sec. 8.g) are given in FIG. 26A. The maximum recorded transmitted forces are 59.2 lbs, 50.8 lbs, 50.8 lbs, 46.5 lbs, and 21.2 lbs, which sum to 228.5 lbs. The profile for the sum of these forces is given in FIG. 26B (in red). (The horizontal axis has been changed from sec to sec*$10^5$ for comparison with FIG. 25.) The applied force profile of FIG. 25 has been superimposed on the total transmitted force plot. The total transmitted force is seen to exceed the applied force at various times during the impact. The maximum value of the sum of the individual transmitted forces (the total transmitted force) is 224.2 lbs. This is slightly smaller than the sum of the maximum values of the individual transmitted forces because the individual maximum values occur at different time during the impact, and it is slightly larger than the maximum applied force of 217.2 lbs. This example illustrates the importance of measuring the transmitted forces in addition to the applied force. Examination of the applied force alone would undervalue the size of the maximum force applied on the helmet user's head during the given impact.

d. Comparison of Free and Constrained Impacts

It was explained above how the constrained impacts used in the prior art helmet testing methods are very different from the free body impacts arising in football games. The stages in a free body impact are illustrated in FIG. 2. The impacting body (left side) compresses onto the target body as it slides forward so that the impactor is subject to an upward elastic force in the direction perpendicular to the local target surface and a backward sliding friction force in the direction parallel to the local target surface. The elastic force is in effect until the impactor rebounds off of the target, and the sliding friction force is in effect until either the impactor begins to execute pure rolling on the target or it departs from the target. (Pure rolling occurs when the linear speed equals the product of the rotational speed and the effective radius.) In either case, the impactor rebounds from the target after decompressing and after moving forward a certain distance on the target, while acquiring a certain amount of forward rotation. (For clarity, the sliding/rolling distance shown in the drawing is greatly exaggerated.) If, on the other hand, the impactor is not a free body but is constrained to rebound in the same direction as the incident direction, the impactor can neither slide on the target nor acquire a rotation. In this case, the forces acting on the impactor are the physical perpendicular elastic force and the net artificial constraining force that prevents the sliding motion and, together with the elastic force, directs the impactor to rebound in the incident direction. In other words, the constraint replaces the backward-directed physical friction force, a force that decreases the impactor's forward sliding speed and increases it's rotational speed, with a very different backward-directed artificial constraining force that completely prevents these motions from occurring. (In the free case, angular momentum is conserved and the target acquires a compensating forward rotation. In the constrained case, the target also acquires a forward rotation from the applied torque, but the value of this rotation is in general very different from the value that arises from a free impact.)

Figure 29A:
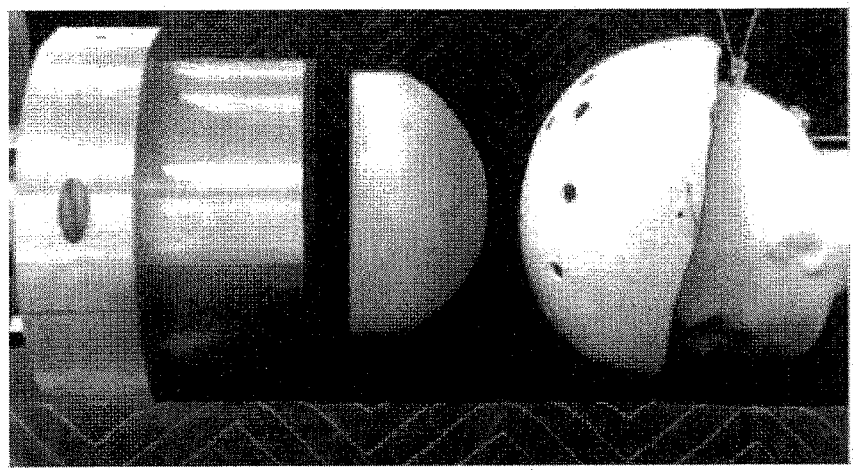
FIGS. 29A and 29B are respectively photographs of a prototype of the cannon device of FIG. 4 and a suspended target body as in FIG. 20, showing a test impact before and after the impact.
Figure 29B:
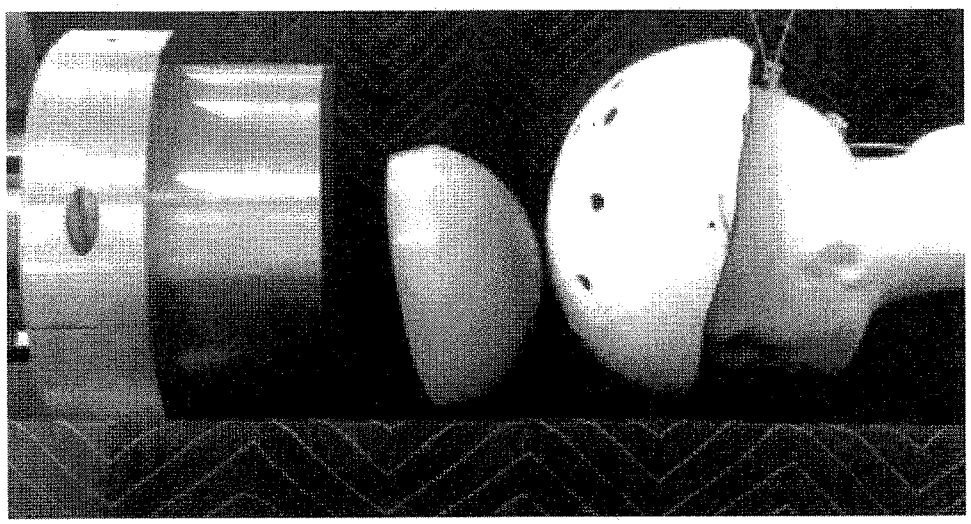

In a recorded use of the cannon of FIG. 4, the rebound direction of impactor 2 is clearly seen to differ from the (horizontal) incident direction, and the impactor is seen to acquire a (counterclockwise) rotation after impact. See FIGS. 29A and 29B. Neither of these physical effects can occur in the impacts used in the prior art. The rebound motion that occurs in such constrained impacts would look exactly like the incident motion.

Figure 27:
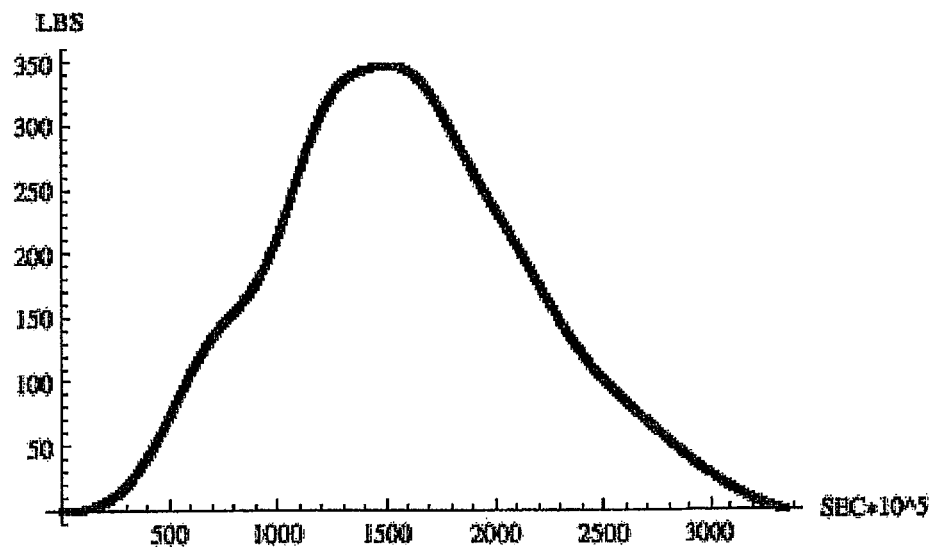
FIG. 27 is a graph showing applied force as a function of time as measured for a helmet test object using the apparatus of FIG. 8.
Figure 28:
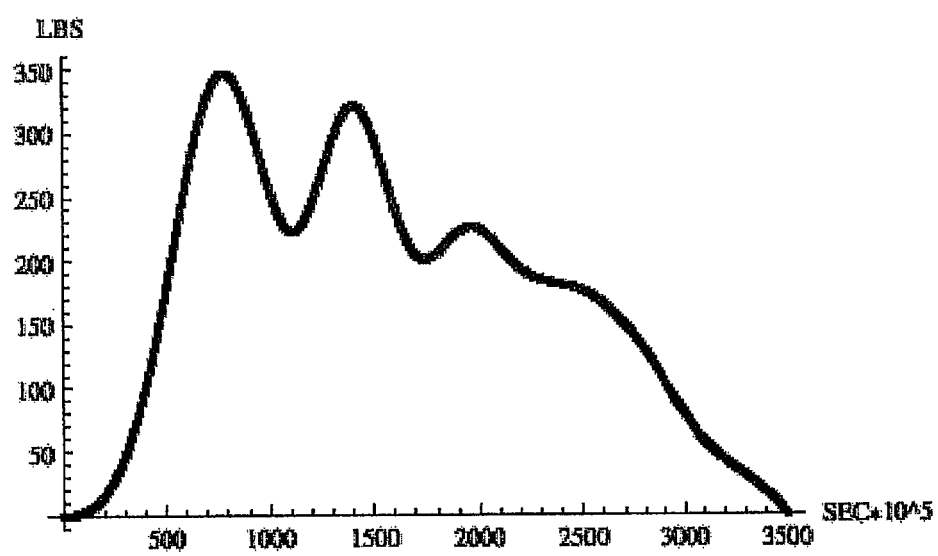
FIG. 28 is a graph showing applied force as a function of time as measured for a helmet test object using the apparatus of FIG. 4.

The differences between free and constrained impacts are also readily displayed in the applied force data measured during these impacts. Data obtained using the vertical tube device described above with reference to FIG. 8 in which a falling helmet and head model 35 impacts onto a fixed solid plate or anvil 37 are shown in FIG. 27. The device of FIG. 8 replicates the impacts created in the NOCSAE equipment (FIG. 1). The same helmet was subjected to impacts using the prototype of the preferred embodiment of the cannon described above with reference to FIG. 4 and target body described with reference to FIGS. 18 and 19. These free body impacts were directed at the same helmet location with the same velocity used in the constrained falling-helmet impacts. The results of applied force measurements on this helmet are shown in FIG. 28. For comparative purposes the two plots have been normalized so that the maximum forces have the same value (350 lbs). The differences between the two plots are apparent. The plot of the data from the constrained impact shows a relatively smooth curve with minimal structure, whereas the plot of the data from the free body impact shows considerable structure in the form of higher frequency oscillations superimposed on the primary curve. These oscillations are real, arising from the weakly-damped elasticity of the padding used in the impacted helmet, and would occur in a game impact at the given velocity and given location on the helmet, but they have been almost completely suppressed by the artificial forces created in the constrained impact.

It is clear from the above theoretical and experimental demonstrations that important differences exist between the unconstrained impacts taught herein and the constrained impacts used in the prior art. Depending on the values of the sliding friction coefficient and COR between an impactor and a helmet, the maximum acceleration recorded in a constrained impact can be significantly less then that which obtains in a real impact between the same impactor and helmet at the same location and velocity. This means in particular that the helmet testing and certifications provided by the use of constrained impacts are not effective in furnishing accurate information about the degree of protection provided by football helmets.

What is claimed is:

1. A target body for safety testing, comprising:
   a head model;
   a helmet mounted to said head model;
   a plurality of force sensor units distributed over said head model; and
   a mounting plate or base platform attached to said head model, said force sensor units being adjustably attached to said mounting plate or base platform,
   each of said force sensor units comprising:
   a tube;
   a post;
   a compression spring; and
   a load cell, said post slidably inserted within the tube and resting on said compression spring, said compression spring in turn in operative contact with said load cell, said post having an upper section extending out of said tube and terminating in an enlarged head with a convex curved surface disposed in contact with an inner surface of said helmet.

2. The target body defined in claim 1 wherein said tube is a main tube and has a threaded bottom section that screws into a threaded concentric lower tube that is attached to said mounting plate or base platform, the height of said main tube being adjustable by rotating said main tube within said threaded concentric lower tube, and the location of said main tube on said mounting plate or base platform is adjustable by sliding said threaded concentric lower tube in a slit in said mounting plate or base platform.

3. The target body defined in claim 2 wherein said threaded concentric lower tube is held place on said mounting plate or base platform by a screw inserted from a bottom surface of said mounting plate or base platform into a bottom of said threaded concentric lower tube, with said screw including a flange nut that is rotated upward to lock said threaded concentric lower tube in place.

4. The target body defined in claim 1 wherein a lower end of said compression spring rests against a contact pin that in turn applies a force exerted by said compression spring onto said load cell.

5. The target body defined in claim 1
wherein said tube is adjustable in height and location on said mounting plate or base platform.

* * * * *